(12) United States Patent
Krosschell et al.

(10) Patent No.: US 9,580,251 B2
(45) Date of Patent: Feb. 28, 2017

(54) CONVEYOR BELT CLEANER

(71) Applicant: Flexible Steel Lacing Company, Downers Grove, IL (US)

(72) Inventors: Marcus Lee Krosschell, Wyoming, MI (US); Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 14/790,773

(22) Filed: Jul. 2, 2015

(65) Prior Publication Data
US 2016/0001982 A1 Jan. 7, 2016

Related U.S. Application Data

(60) Provisional application No. 62/021,050, filed on Jul. 4, 2014.

(51) Int. Cl.
 *B65G 45/12* (2006.01)
 *B65G 45/16* (2006.01)

(52) U.S. Cl.
 CPC .................... *B65G 45/16* (2013.01)

(58) Field of Classification Search
 CPC ................ B65G 45/12; B65G 45/16
 USPC ................................. 198/497–499
 See application file for complete search history.

(56) References Cited

U.S. PATENT DOCUMENTS

| 936,887 A | 10/1909 | Healey |
| 3,342,312 A | 9/1967 | Reiter |
| 3,674,131 A | 7/1972 | Matson |
| 3,767,210 A | 10/1973 | Havens et al. |
| 3,841,470 A | 10/1974 | Meguro |
| 3,952,863 A | 4/1976 | Schattauer |
| 3,994,384 A | 11/1976 | Reiter |

(Continued)

FOREIGN PATENT DOCUMENTS

| CA | 1221050 | 4/1987 |
| CA | 2116581 | 3/1993 |

(Continued)

OTHER PUBLICATIONS

Hosch, Hosch Sprung Blade Scrapers, Type C1V, Hosch Company, 2007, 2 pages.

(Continued)

*Primary Examiner* — Douglas Hess
(74) *Attorney, Agent, or Firm* — Fitch, Even, Tabin & Flannery LLP

(57) ABSTRACT

In accordance with one aspect, a cleaner for a conveyor belt is provided having a scraper blade for engaging a conveyor belt traveling in a downstream direction and a rigid fulcrum member extending laterally transverse to the downstream direction. The cleaner includes a blade mount member having an upper arm portion connected to the scraper blade, an intermediate portion spaced upstream from the rigid fulcrum member, and a lower arm portion extending from the intermediate portion, under the rigid fulcrum member, and downstream beyond the fulcrum member. The cleaner has a resilient support for the blade mount member configured to allow the blade mount member to resiliently rock about the rigid fulcrum member as the scraper blade is impacted during conveyor belt operations.

30 Claims, 14 Drawing Sheets

(56) References Cited

U.S. PATENT DOCUMENTS

| | | | |
|---|---|---|---|
| 3,994,388 A | 11/1976 | Reiter | |
| 4,031,252 A | 6/1977 | Sullivan et al. | |
| 4,036,354 A | 7/1977 | Reiter | |
| 4,053,045 A | 10/1977 | Reiter | |
| 4,105,109 A | 8/1978 | Schultz | |
| 4,182,444 A | 1/1980 | Fisher | |
| 4,189,046 A | 2/1980 | Ward et al. | |
| 4,249,650 A | 2/1981 | Stahura | |
| 4,359,150 A | 11/1982 | Bowman et al. | |
| 4,529,084 A | 7/1985 | Zhang | |
| 4,533,035 A | 8/1985 | Reiter | |
| 4,533,036 A | 8/1985 | Gordon | |
| 4,541,523 A | 9/1985 | Stockton | |
| 4,620,627 A | 11/1986 | Griffiths | |
| 4,633,999 A | 1/1987 | Perneczky | |
| 4,639,967 A | 2/1987 | Bordignon | |
| 4,641,852 A | 2/1987 | Kerst et al. | |
| 4,658,949 A | 4/1987 | Reicks | |
| 4,694,952 A | 9/1987 | Meijer | |
| 4,696,389 A | 9/1987 | Schwarze | |
| 4,768,644 A | 9/1988 | Cromm | |
| 4,779,716 A | 10/1988 | Gordon | |
| 4,792,154 A | 12/1988 | Kerst et al. | |
| 4,825,996 A | 5/1989 | Davidts | |
| 4,838,409 A | 6/1989 | Rappen | |
| 4,850,474 A | 7/1989 | Schwarze | |
| 4,854,443 A | 8/1989 | Gordon | |
| 4,887,329 A | 12/1989 | Perneczky | |
| 4,917,231 A * | 4/1990 | Swinderman | B65G 45/12 198/497 |
| 4,953,689 A | 9/1990 | Peterson et al. | |
| 4,962,845 A | 10/1990 | Gibbs | |
| 5,011,002 A | 4/1991 | Gibbs | |
| 5,014,844 A | 5/1991 | Anttonen | |
| 5,016,746 A | 5/1991 | Gibbs | |
| 5,031,750 A | 7/1991 | Barnes | |
| 5,082,106 A | 1/1992 | Schwarze | |
| 5,088,965 A | 2/1992 | Swinderman et al. | |
| 5,114,000 A | 5/1992 | Rappen | |
| 5,213,197 A | 5/1993 | Mohri | |
| 5,222,588 A | 6/1993 | Gordon | |
| 5,247,778 A | 9/1993 | Tisma | |
| 5,301,797 A | 4/1994 | Hollyfield, Jr. et al. | |
| 5,372,244 A | 12/1994 | Morin | |
| 5,518,107 A | 5/1996 | Schwarze | |
| 5,573,102 A | 11/1996 | Puchalla | |
| 5,611,524 A | 3/1997 | Gordon | |
| 5,692,595 A | 12/1997 | Gilbert | |
| 5,727,670 A | 3/1998 | Johnson | |
| 5,797,477 A | 8/1998 | Veenhof | |
| 5,826,700 A | 10/1998 | Brink | |
| 5,865,997 A * | 2/1999 | Isaacs | B01D 33/04 198/499 |
| 5,950,803 A | 9/1999 | Schwarze | |
| 5,975,281 A | 11/1999 | Yoshizako et al. | |
| 6,041,913 A | 3/2000 | Dolan | |
| 6,056,112 A | 5/2000 | Wiggins | |
| 6,076,656 A | 6/2000 | Mat | |
| 6,082,524 A | 7/2000 | Brink | |
| 6,152,290 A | 11/2000 | Mott et al. | |
| 6,179,114 B1 | 1/2001 | Brink | |
| 6,279,727 B1 | 8/2001 | Waalkes et al. | |
| 6,283,274 B1 | 9/2001 | Dolan et al. | |
| 6,296,105 B1 | 10/2001 | Carnes | |
| 6,315,105 B1 | 11/2001 | Gibbs et al. | |
| 6,321,901 B1 | 11/2001 | Strebel et al. | |
| 6,454,080 B1 | 9/2002 | Brink | |
| 6,581,754 B2 | 6/2003 | Law | |
| 6,681,919 B1 | 1/2004 | Brink | |
| 6,749,725 B1 | 6/2004 | Isometsa et al. | |
| 6,823,983 B2 | 11/2004 | DeVries | |
| 6,843,363 B2 | 1/2005 | Schwarze | |
| 6,860,378 B1 | 3/2005 | Johannsen | |
| 6,874,616 B2 | 4/2005 | DeVries et al. | |
| 6,929,112 B2 | 8/2005 | Hall | |
| 7,007,794 B2 | 3/2006 | Waters et al. | |
| 7,093,706 B2 | 8/2006 | DeVries et al. | |
| 7,216,756 B2 | 5/2007 | Swinderman | |
| 7,240,393 B2 * | 7/2007 | Shyu | G03G 21/0029 118/104 |
| 7,308,980 B2 | 12/2007 | Peterson et al. | |
| 7,367,443 B2 | 5/2008 | Swinderman | |
| 7,370,750 B2 | 5/2008 | Swinderman | |
| 7,740,127 B2 | 6/2010 | Swinderman et al. | |
| 7,987,966 B2 | 8/2011 | DeVries et al. | |
| 8,157,082 B2 * | 4/2012 | Puchalla | B65G 45/16 198/499 |
| 8,167,114 B2 * | 5/2012 | Khanania | B65G 45/16 198/497 |
| 8,312,986 B2 | 11/2012 | DeVries et al. | |
| 8,602,205 B2 | 12/2013 | Yoshizako et al. | |
| 8,640,856 B2 | 2/2014 | DeVries et al. | |
| 8,757,360 B2 | 6/2014 | Kuiper et al. | |
| 9,085,419 B2 | 7/2015 | Kuiper et al. | |
| 9,090,405 B2 | 7/2015 | DeVries et al. | |
| 2003/0066738 A1 | 4/2003 | Veenhof | |
| 2005/0247543 A1 | 11/2005 | DeVries et al. | |
| 2006/0131136 A1 | 6/2006 | Smith et al. | |
| 2008/0251358 A1 | 10/2008 | Thew | |
| 2010/0000842 A1 | 1/2010 | DeVries et al. | |
| 2011/0203904 A1 | 8/2011 | Kuiper et al. | |
| 2013/0175743 A1 | 7/2013 | Gibbs et al. | |

FOREIGN PATENT DOCUMENTS

| | | |
|---|---|---|
| DE | 3402407 A1 | 7/1985 |
| DE | 3908873 A1 | 11/1989 |
| EP | 0254977 A1 | 2/1988 |
| FR | 2590243 A1 | 5/1987 |
| GB | 2125357 | 3/1984 |
| GB | 2165200 | 4/1986 |
| GB | 2221887 A | 2/1990 |
| GB | 2290276 A | 12/1995 |
| WO | 9714635 | 4/1997 |
| WO | 0078650 A1 | 12/2000 |

OTHER PUBLICATIONS

Martin, Orion Belt Cleaning Systems, Belt Cleaners, Form No. L3719-07/08 (2005, 2008) (2 pages).

Martin, Orion Belt Cleaning Systems, Orion 2000 and H20-4000 Belt Cleaners Operator\s Manual M3702 (2005, 2009) (42 pages).

Martin, Orion Belt Cleaning Systems, Orion 2000 Secondary Cleaner, Form No. L3709-06/08 (2005, 2008) (2 pages).

Martin, Reversing Mount Tensioners Operator's Manual, Martin Engineering 1996, 1998, Aug. 1999, 30 pages.

Notification of Transmittal of International Search Report and the Written Opinion of the International Searching Authority, or the Declaration from the International Bureau of WIPO for International Application No. PCT/US2015/039076 dated Sep. 18, 2015, 12 pages.

Notification of Transmittal of the International Search Report and the Written Opinion of the International Searching Authority, or the Declaration from the International Bureau of WIPO for International Application No. PCT/US2009/040204 dated Jun. 8, 2009, 13 pages.

Notification of Transmittal of the International Search Report and the Written Opinion of the International Searching Authority, or the Declaration from the International Bureau of WIPO for International Application No. PCT/US2011/026379 dated Apr. 28, 2011, 10 pages.

* cited by examiner

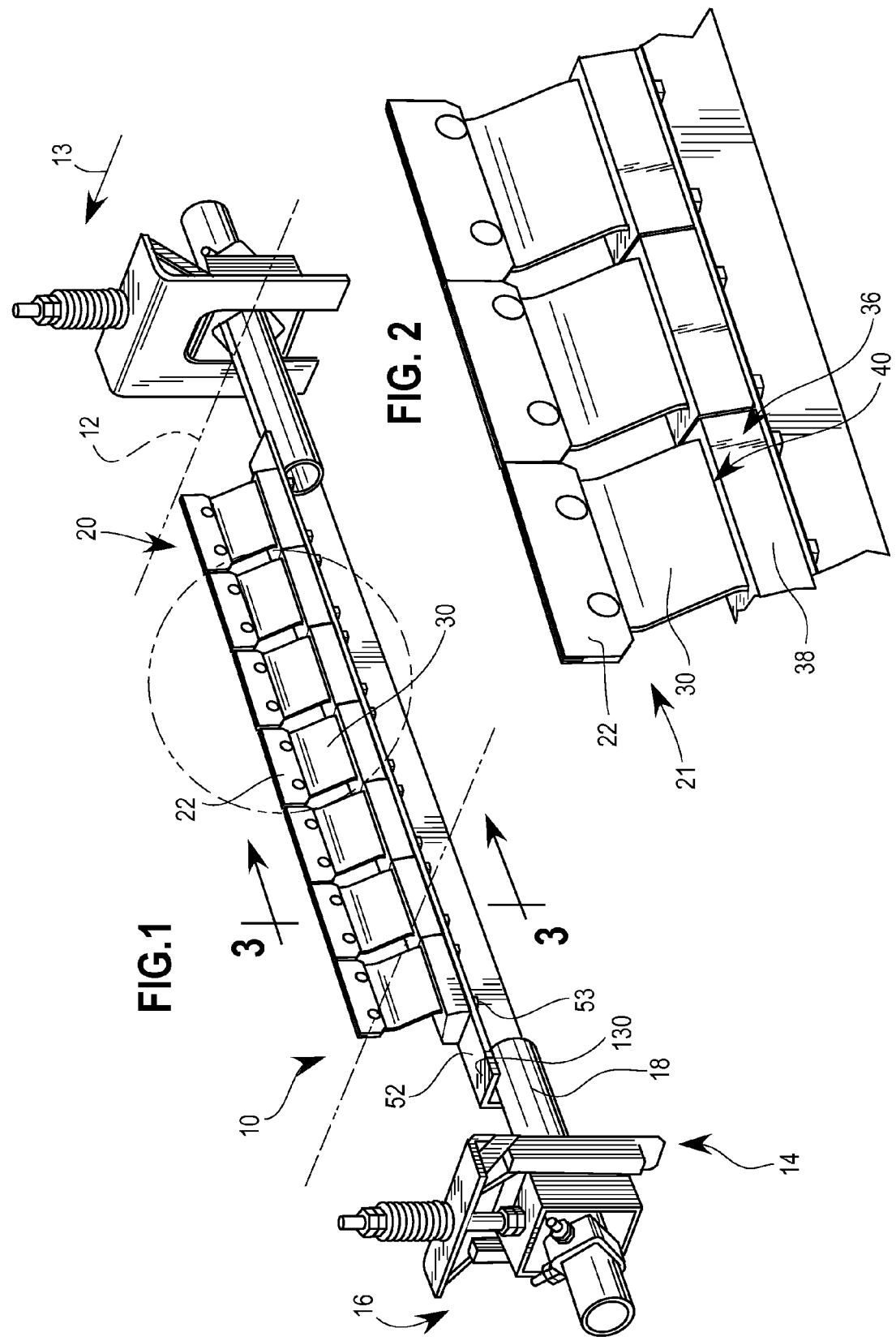

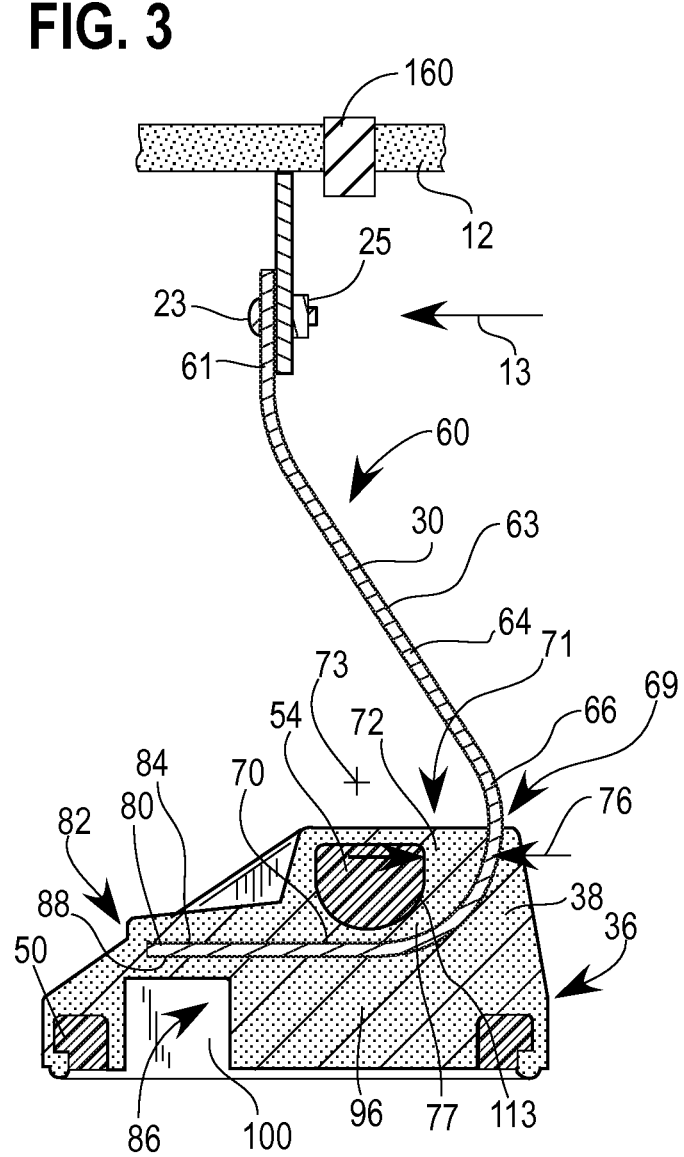

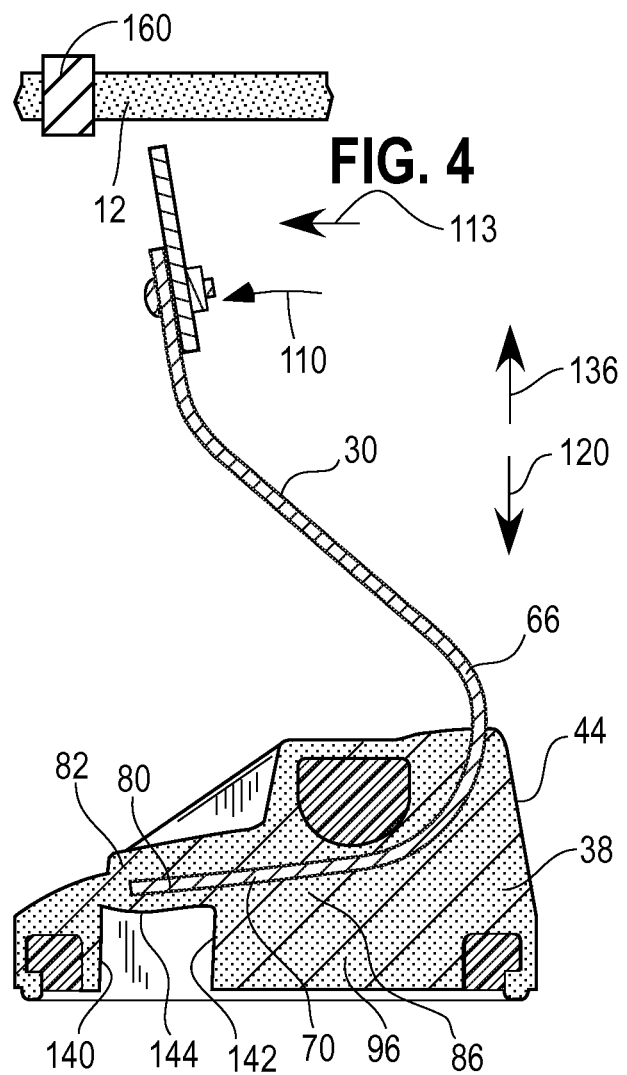

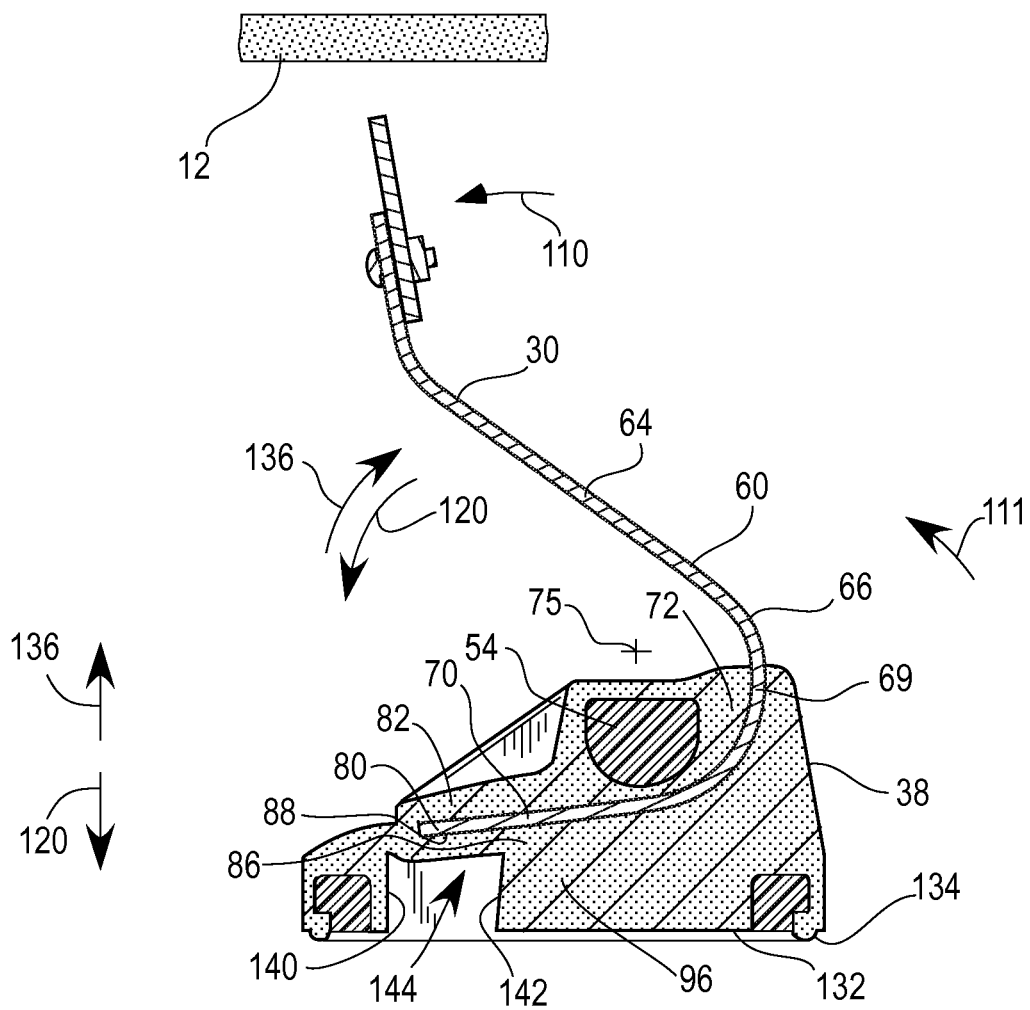

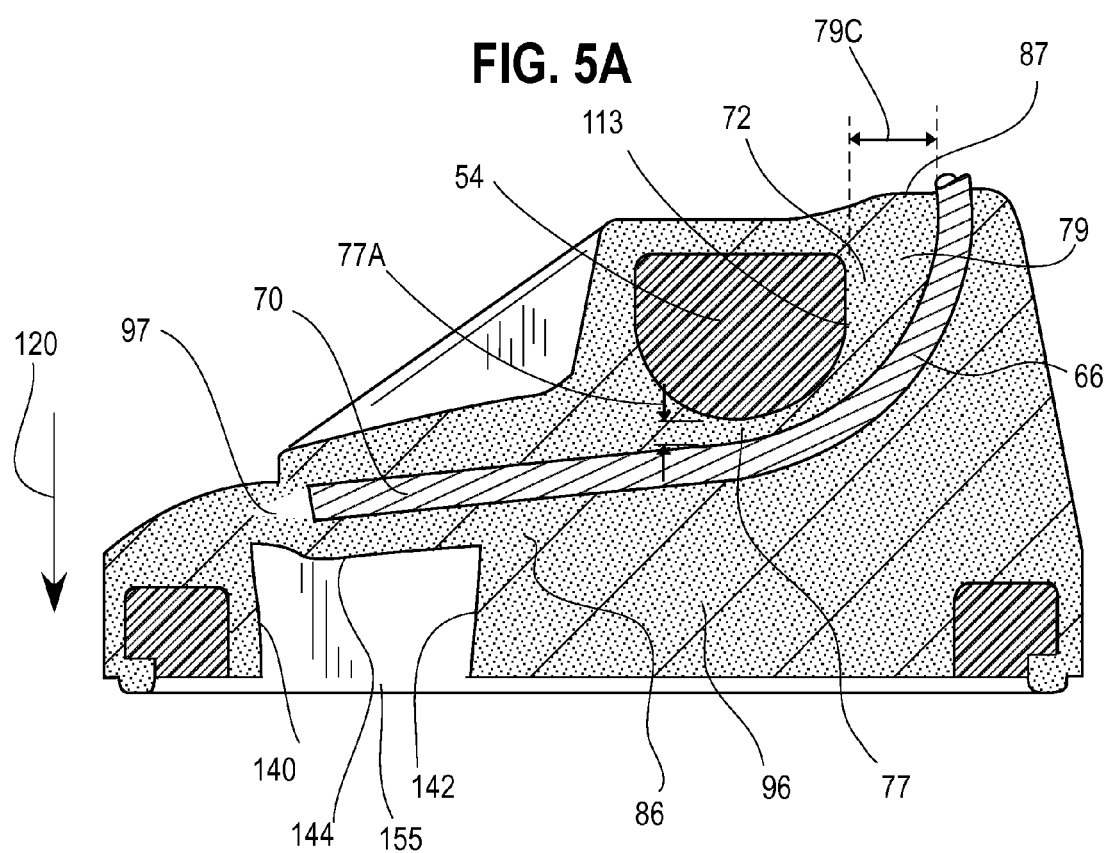

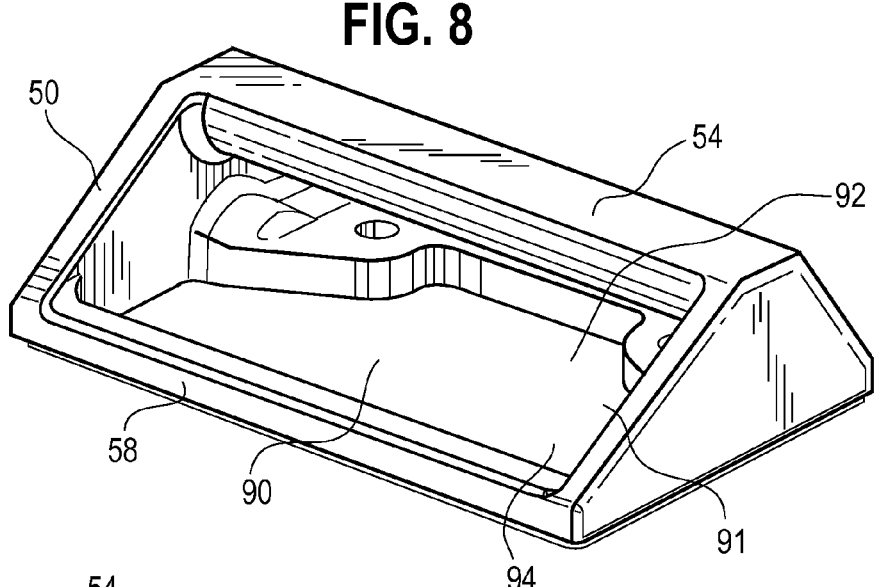
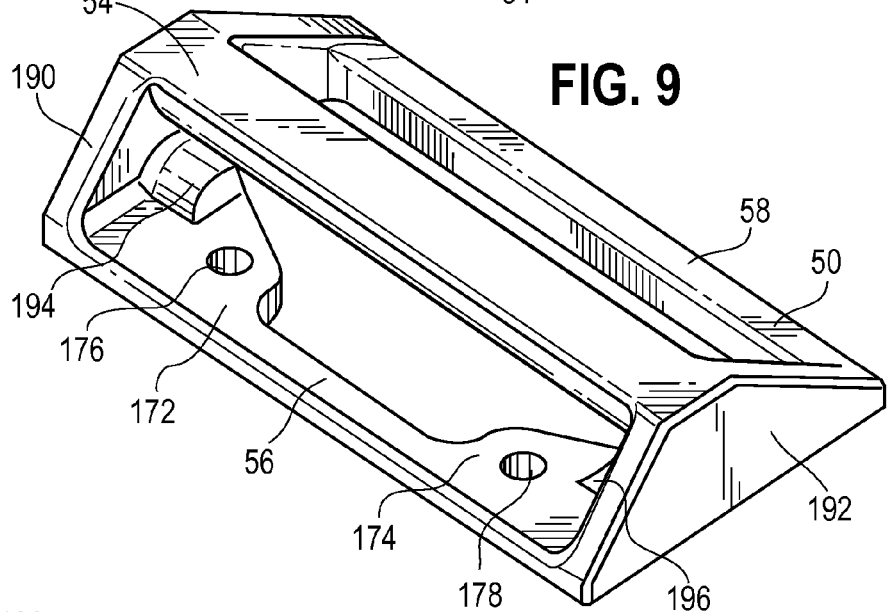
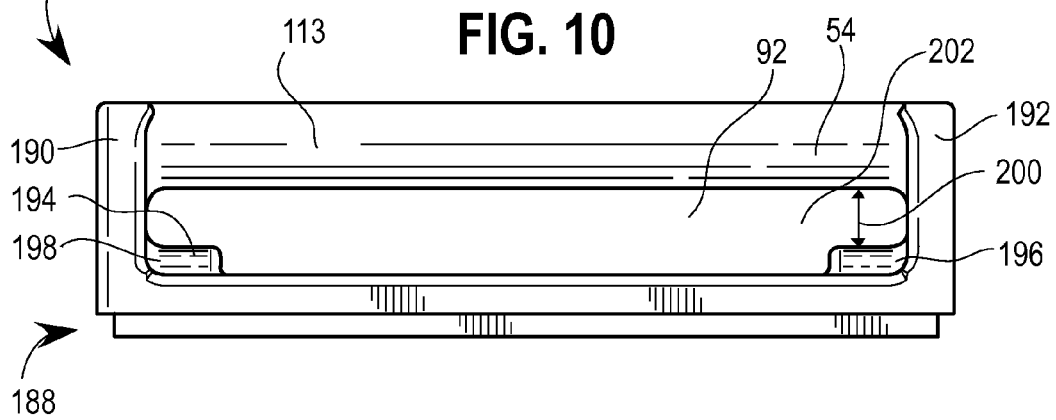

CONVEYOR BELT CLEANER

CROSS-REFERENCE TO RELATED APPLICATION

This application claims the benefit of U.S. Provisional Patent Application No. 62/021,050, filed Jul. 4, 2014, which is hereby incorporated by reference in its entirety.

FIELD

The invention relates to cleaners for conveyor belts and, more particularly, to cleaners having one or more scraper blades for scraping conveyor belts.

BACKGROUND

Cleaners that utilize scraper blades to remove debris and other materials from conveyor belts are known. Conveyor belts often include metallic splices extending across the belt that run past the scraper blades during conveyor belt operations. The scraper blades are typically biased into engagement with the belt to allow them to resiliently shift away from the belt when surface irregularities on the belt are encountered such as due to the aforementioned metallic splices.

Generally, the goal of keeping each scraper blade in substantially constant contact with the belt to improve cleaning thereof is in competition with the need to allow the blade to shift away from the belt to avoid taking the full brunt of impacts with metallic splices and the like which can cause damage to both the scraper blade and the metallic splice. In heavier duty applications, this problem can be exacerbated by the use of thicker, more robust fasteners of the metallic splice which create higher impact loads on the scraper blade.

U.S. Pat. No. 7,093,706 discloses a prior conveyor belt cleaner having a spring plate that is mounted to an angle bracket of a pole extending across the conveyor belt. The cleaner has a resilient pad under the spring plate to maintain a scraper blade supported by the spring plate engaged against the conveyor belt with a minimum of chatter. A pair of bolts extend through openings in the spring plate, through the resilient pad, and engage the angle bracket to secure the spring plate to the angle bracket. When a metallic splice strikes the scraper blade, the spring plate absorbs impacts transmitted from the scraper blade. A relatively thick spring plate may be used to increase the durability of the spring plate. However, this increases rigidity of the spring plate and increases the inertia of the spring plate and scraper blade; both of which make it more difficult for the scraper blade to shift out of the way of the conveyor belt metallic splices.

SUMMARY

In accordance with one aspect of the present invention, a cleaner for a conveyor belt is provided having a scraper blade for engaging a conveyor belt traveling in a downstream travel direction and a rigid fulcrum member extending laterally transverse to the downstream travel direction. The cleaner includes a blade mount member having an upper arm portion connected to the scraper blade and an intermediate portion spaced upstream from the rigid fulcrum member. The blade mount member has a lower arm portion extending from the intermediate portion, under the rigid fulcrum member, and downstream beyond the rigid fulcrum member. The cleaner has a resilient support for the blade mount member configured to allow the blade mount member to resiliently rock about the rigid fulcrum member as the scraper blade is impacted during conveyor belt operations. By utilizing the rigid fulcrum member extending laterally transverse to the conveyor belt downstream travel direction, the fulcrum member provides a rigid support against loading applied against the scraper blade such as loading from conveyor splices. Further, the ability of the blade mount member to resiliently rock about the fulcrum member improves the ability of the scraper blade and blade mount member to navigate around a conveyor belt splice or other belt imperfection because the blade mount member may rock about the fulcrum member to a position that corresponds to, for example, the impact force and the shape of the splice. Stated differently, the blade mount member may rock to different positions about the rigid fulcrum member in response to different splice impacts rather than being constrained to movement around the same fixed pivot point regardless of the velocity of the splice, shape of the splice, etc. Further, the increased freedom of movement of the blade mount member limits stress concentrations in the blade mount member which improves the durability of the blade mount member.

The lower arm portion of the blade mount member may have a lower surface and the resilient support may include a lower portion extending along the lower surface of the lower arm portion. The resilient member lower portion resists downward pivoting of the blade mount member lower arm portion as the blade mount member rocks about the rigid fulcrum member in response to the scraper blade being impacted during conveyor belt operations. The resilient member lower portion urges the blade mount member lower arm portion upwardly to return the blade mount member back toward an undeflected position about the fulcrum member and return the scraper blade into engagement with the conveyor belt.

The present invention also includes a conveyor belt cleaner having a rigid base for being mounted to a support, such as an elongated member extending across a conveyor belt, and a blade support member having a lower portion for being connected to the rigid base. The blade support member has an upper portion for supporting a scraper blade with the upper portion being movable relative to the rigid base during conveyor belt operations. The conveyor belt cleaner further includes a resilient body molded in situ with the rigid base and the blade support member, the molded body extending about the rigid base and the lower portion of the blade support member with the blade support member lower portion completely embedded in the molded body. Because the blade support member lower portion is completely embedded in the molded body, the molded body may connect the blade support member lower portion to the rigid base without using a rigid connection which can act as a stress riser, such as a bolt or weld. The blade support member lower portion may therefore have fewer stress risers which improves the durability of the blade support member.

Another advantage of the blade support member lower portion being completely embedded in the molded body is that the molded body provides compliance for the blade mount member to pivot or move in response to conveyor belt imperfections contacting the scraper blade. The molded body provides the compliance via resilient properties of the body rather than exposed gaps or voids as in some prior conveyor belt cleaners. The exposed gaps or voids of these prior conveyor belt cleaners may become filled with fugitive material from the conveyor belt which compromises the compliance of the prior conveyor belt cleaners. Thus, the subject conveyor belt cleaner provides a more durable mechanism for resiliently deflecting the scraper blade while reducing the likelihood of the scraper blade movement becoming inhibited by debris build-up on the conveyor belt cleaner.

A cleaner for a conveyor belt is also provided that includes a scraper blade, a rigid base with a fulcrum member, and a blade mount member having an upper portion connected to the scraper blade and a lower portion extending about the fulcrum member. The conveyor belt cleaner further includes a resilient material connected to the blade mount member and having upper and lower biasing portions extending along the blade mount member. The upper biasing portion extends between the blade mount member lower portion and the rigid base fulcrum member. The lower biasing portion is separated from the fulcrum member by both the upper biasing portion and the blade mount member. As the upper portion of the blade mount member deflects in response to impacts against the scraper blade, the blade mount member lower portion may rock upward about the fulcrum member which causes the blade mount member lower portion to compress the upper biasing member against the fulcrum member. The rigid base may be secured to a support, such as a pole having an angle bar section, and the blade mount member lower portion includes an arm portion with the lower biasing portion extending between the arm portion and the support. The upward rocking of the blade mount lower portion causes the blade mount member arm portion to tilt downward and compress the lower biasing portion between the arm portion and the support. In this manner, the upper and lower biasing portions may each resiliently resist different aspects of the motion of the blade mount member about the fulcrum member and absorb impacts from the conveyor belt.

In one form, the upper biasing portion has a thickness between the blade mount member lower portion and the rigid base fulcrum member which varies along the blade mount member lower portion. For example, the thickness of the resilient material may increase from a lower end of the fulcrum member toward an upper end of the fulcrum member. The blade mount member lower portion may deflect by a progressively greater distance toward the upper end of the fulcrum member such that the increasing thickness of the upper biasing portion provides more material of the blade mount member lower portion to compress as it rocks upward about the fulcrum member. This additional material accommodates the greater deflection distance of the blade mount member lower portion toward the upper end of the fulcrum member which ensures that the blade mount member lower portion is resiliently supported throughout its entire range of motion.

BRIEF DESCRIPTION OF THE DRAWINGS

FIG. 1 is a perspective view of a conveyor belt cleaning system showing cleaner units mounted to a support assembly and including scraper blades for being biased into engagement with a conveyor belt;

FIG. 2 is an enlarged partial view of the area within the dashed circle of FIG. 1 showing the cleaner units each having an angled blade mount member supporting the associated scraper blade and a base in which the blade mount member is secured;

FIG. 3 is a cross-sectional view of one of the cleaner units taken across line 3-3 in FIG. 1 showing a resilient body and a frame of the base and the resilient body holding the blade mount member relative to the frame;

FIG. 4 is a cross-sectional view similar to FIG. 3 showing the scraper blade and blade mount member in an intermediate, deflected position in response to the conveyor belt splice having impacted the scraper blade;

FIG. 5 is a cross-sectional view similar to FIG. 4 showing the scraper blade and the blade mount member in a fully deflected position in response to the conveyor belt splice impacting the scraper blade;

FIG. 5A is an enlarged, cross-sectional view of a portion of the cleaner unit of FIG. 5 showing the resilient body in a fully deflected configuration;

FIG. 8 is a rear perspective view of the frame of the cleaner unit of FIG. 6 showing a cavity of the frame in which the arm portion of the blade mount member may shift downwardly in response to conveyor belt imperfections contacting the scraper blade;

FIG. 9 is a front perspective view of the frame of the cleaner unit of FIG. 6 showing the upper cross bar and lower, transverse supports of the frame;

FIG. 10 is a front elevational view of the frame of the cleaner unit of FIG. 6 showing an opening between the frame cross bar and the lower supports sized to receive the blade mount member;

DETAILED DESCRIPTION

Figure 3A:
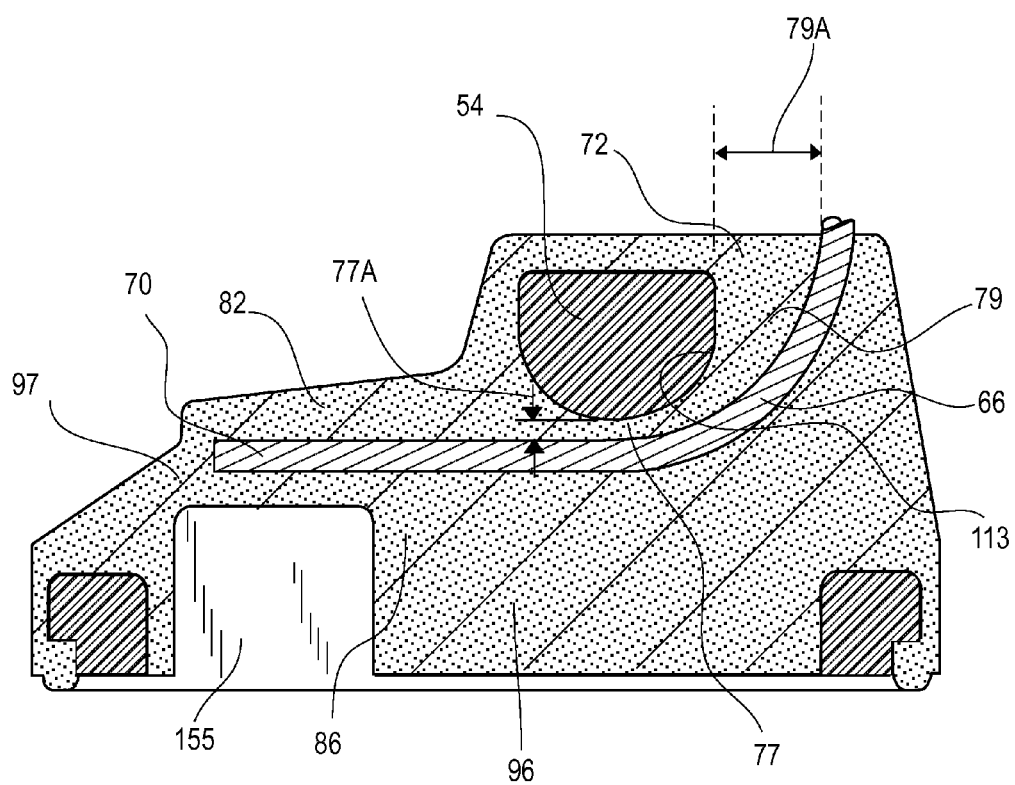
FIG. 3A is an enlarged, cross-sectional view of a portion of the cleaner unit of FIG. 3 showing the resilient body in an undeflected configuration.

In FIG. 1, a conveyor belt cleaner system 10 for cleaning a conveyor belt 12 is illustrated. The conveyor belt cleaner system 10 has an elongate support or support assembly 14 for extending across the conveyor belt 12 and being secured on opposite sides thereof. The conveyor belt cleaner system 10 may be installed on a conveyor belt at, for example, the six o'clock position on the conveyor head pulley or farther downstream in the conveyor belt travel direction 13. The support assembly 14 includes mounts, such as resilient mounts 16, on opposite sides of the conveyor belt 12 and a pole member 18 secured to the mounts 16. The support assembly 14 may have a variety of configurations, such as those disclosed in U.S. Pat. No. 7,093,706 which issued on Aug. 22, 2006 and U.S. Provisional Patent Application No. 61/915,177, filed Dec. 12, 2013, both of which are hereby incorporated by reference. The pole member 18 has a right angle bracket 52 that supports a number of modular cleaning units 20 each having a scraper 21 with a blade 22 which is resiliently urged against the conveyor belt 12. This keeps the scraper blade 22 in engagement with the belt 12 as it is running despite surface irregularities, such as conveyor belt splices, damaged belt sections, and large pieces of conveyed material, which may be present on the conveyor belt 12 while allowing the scraper blade 22 to shift away from the conveyor belt 12 when necessary to avoid the scraper blade 22 from taking the full brunt of an impact from the surface irregularity.

The scraper 21 may have a variety of forms, such as a unitary, one-piece member including the scraper blade 22. In another form, the scraper 21 may include two or more components such as a scraper blade 22 and a blade mount member 30 secured together. The blade mount member 30 is made of a strong material, such as steel, to resist loading during conveyor belt operations. In one form, the cleaning units 20 may each have a first resilient mount that includes the blade mount member 30 of the cleaning unit 20. The blade mount member 30 may be made of spring steel and operate as a fast-rate spring that permits small deflections of the scraper blade 22 and causes a quick return of the scraper blade 22 back into engagement with the conveyor belt 12. The spring steel of the blade mount member 30 is relatively stiff to maintain the scraper blade 22 in engagement with the conveyor belt 12.

With reference to FIG. 2, the cleaning units 20 have a second resilient mount, such as a base 36, with a resilient body 38 molded in situ with the blade mount member 30. The in situ molding provides a firmly engaged interface 40 between the body 38 and the blade mount member 30 without large exposed gaps or openings such that the cleaning unit 20 resists contamination from fugitive material from the conveyor belt 12, such as material carried by the belt such as coal dust scraped from the belt by the blade 22. In some prior conveyor belt cleaners, the cleaners have exposed exterior gaps or voids such as clearances between components that are taken up as the scraper blade deflects. The exterior gaps or voids of these prior cleaners may become packed with debris which prevents the components from taking up the gaps or voids and permitting deflection of the scraper blade. Because the cleaning unit 20 may not have any exposed gaps or voids due to the overmold of the resilient body 38, the cleaning unit 20 lacks any exposed gaps or voids that can be filled with debris such that the cleaning unit 20 is immune to debris limiting deflection of the scraper blade. In some approaches, the blade mount member 30 may be rigid and does not operate as a spring in the cleaning unit 20. Instead, the cleaning unit 20 utilizes the body 38 to provide the resilient deflection of the scraper blade 22.

With reference to FIG. 3, the base 36 includes a rigid base, such as frame 50, which is also molded in situ with the resilient body 38. By rigid, what is meant is that the structure has the ability to generally retain its shape during expected use. The frame 50 has a fulcrum member, such as a cross bar 54, and transverse, front and rear supports 56, 58 (see FIG. 9) extending laterally transverse to the travel direction 13 of the conveyor belt 12. The blade mount member 30 has an upper portion 60 to which the scraper blade 22 is attached and a lower portion 69 extending about the cross bar 54 in the space between the cross bar 54 and the supports 56, 58 of the frame 50. The cleaner unit 20 includes a dynamic pivot point 71 which permits the blade mount member lower portion 69 to rock to different fulcrum points about the cross bar 54 in response to deflection of the blade mount member upper portion 60 from conveyor belt operations. The dynamic pivot point 71 permits this movement of the blade mount lower portion 69 throughout a range of positions progressively extending upward and along an outer surface 113 of the cross bar 54 as the blade mount member upper portion 60 deflects due to conveyor belt operations. The dynamic pivot point 71 provides a pivot axis for the blade mount member 30 that progressively shifts along the outer surface 113 of the cross bar 54 as the arcuate portion 66 rocks upwardly and toward the cross bar 54.

The upper portion 60 of the blade mount member 30 includes a layback portion 64 extending upwardly and downstream from the lower portion 69. The angle of the layback portion 64 is selected in conjunction with the length of the layback portion 64 and the stiffness of the blade mount member 30 to keep the scraper blade 22 in engagement with the conveyor belt 12 despite loading from conveyor belt operation on the blade mount member 30. The layback portion 64 is angled relative to the conveyor belt 12, which encourages debris that falls from the conveyor 12 onto an upstream facing surface 63 of the layback portion 64 to slide off of the layback portion 64, over the interface 40 (see FIG. 2) between the blade mount member 30 and the resilient body 38, and down an upstream face 44 (see FIG. 4) of the body 38 without becoming lodged in exposed gaps or voids as in prior conveyor belt cleaners. The upper portion 60 may also include an upwardly turned section 61 to which the scraper blade 22 is secured. The upwardly turned section 61 orients the scraper blade 22 to engage the conveyor belt 12 at an approximately ninety degree angle which provides a balance of scraping ability and reducing the impacts of conveyor belt fasteners against the scraper blade 22. Rather than extending upwardly from the layback portion 64 to orient the scraper blade 22 at a ninety degree angle, the section 61 may instead be oriented to extend at a different angle, such as an acute angle or an obtuse angle as desired for a particular application.

The lower portion 69 of the blade mount member 30 includes an intermediate portion, such as arcuate portion 66, which may flex to allow deflection of the layback portion 64 and the scraper blade 22 attached thereto. With reference to FIGS. 3 and 4, the arcuate portion 66 has a radius of curvature in an undeflected configuration of the arcuate portion 66 with a center at point 73. As the layback portion 64 deflects and causes the arcuate portion 66 to flex, the radius of curvature of the arcuate portion 66 decreases and the center of the radius curvature moves downwardly and upstream to point 75. The radius of the arcuate portion 66 is significantly smaller than the length of the layback portion 64 so that relatively small flexing movements of the arcuate portion 66 generates significantly larger movements of the scraper blade 22. This reduces the stresses or strains in the blade mount member 30 in comparison to prior conveyor belt cleaners having members that shift by an amount corresponding to the displacement of their blades. As noted above, some embodiments of the blade mount member 30 may be rigid rather than resiliently permitting deflection of the scraper blade 22. In these embodiments, the arcuate portion 66 of the blade mount member 30 retains its shape rather than decreasing in its radius of curvature. Another variation of the blade mount member 30 is that the intermediate portion of the blade mount member may have a different shape, such as being a ninety-degree corner between the layback portion 64 and the arm portion 70.

The arcuate portion 66 of the blade mount member 30 extends about the cross bar 54 and transitions to an arm portion 70 extending below and downstream of the cross bar 54, as shown in FIG. 3. The resilient body 38 has a fulcrum portion 72 extending between the cross bar 54 and the blade mount member arcuate portion 66. The fulcrum portion 72 has a variable thickness 76 that permits the arcuate portion 66 to deflect a greater amount as the arcuate portion 66 rocks toward and upward along the cross bar 54. With respect to FIG. 3A, the variable thickness 76 includes a thinner region 77 having a thickness 77A at the transition between the arcuate portion 66 and the arm portion 70 and a thicker region 79 with a thickness 79A as the blade mount member 30 extends outward from the resilient body 38. The varying thickness of the fulcrum portion 72 is advantageous because the blade mount member 30 deflects progressively farther as the blade mount member 30 extends about the arcuate portion 66 heading away from the arm portion 70, i.e., upward around the cross bar 54. Thus the thicker region 79 will compress a greater amount than the thinner region 77 because the arcuate portion 66 at the thicker region 79 deflects farther during conveyor belt operations than the arcuate portion 66 at the thinner region 77. With reference to FIGS. 3A, 4A, and 5A, the thickness 79A of the thicker region 79 decreases to a thickness 79C as the arcuate portion 66 rocks upward and toward the cross bar 54 due to the deflection of the layback portion 64. In one approach, the thickness 79C in the range of approximately 15 percent to approximately 25 percent, such as 18 percent, less than the thickness 79A. By contrast, the thickness 77A of the thinner region 77 remains substantially the same as the arcuate portion 66 rocks upwardly about the cross bar 54.

With reference to FIGS. 3, 4, and 5, the blade mount member 30 has an end 80 that is embedded within the resilient body 38. By embedded, it is meant that the resilient body 38 extends along upper and lower surfaces 84, 88, lateral side surfaces, and the end surface of the end 80 such that all surfaces of the blade mount member 30 at the end 80 are covered by the material of the resilient body 38. The end 80 can pivot upwardly and downwardly in directions 136, 120 within the resilient body 38 as the blade mount member arcuate portion 60 rocks about the cross bar 54 in response to deflection of the blade mount member layback portion 64. To control movement of the blade mount member end 80, the resilient body 38 has an end upper support portion 82 extending along the upper surface 84 of the arm portion 70 and an end lower support portion 86 extending along the lower surface 88 of the arm portion 70. The end lower support portion 86 engages the lower surface 88 of the blade mount member end 86 and resists downward movement of the end 80 caused by deflection of the layback portion 64. Further, the end upper support portion 82 engages the upper surface 84 and resists upward movement of the end 80 such as due to the layback portion 64 rebounding beyond the undeflected position thereof. The end upper and lower support portions 82, 86 thereby control pivoting of the arm portion 70 of the blade mount member 30 in both downward and upward directions 120, 136 throughout the range of motion of the blade mount member 30. It will be appreciated that the thicknesses of the end upper and lower support portions 82, 86 may be adjusted to provide a desired amount of resistance to pivoting of the arm portion 70. For example, the thickness of the end upper support portion 82 may be increased and the thickness of the end lower support portion 86 may be decreased to increase the overall resistance to pivoting of the arm portion 70. Decreasing the thickness of the end lower support portion 86 provides less resilient material to resist movement of the arm portion 70 before the angle bracket 52 rigidly resists movement of the arm portion 70. Conversely, the thickness of the end upper support portion 82 may be reduced and the thickness of the end lower support portion 86 increased to decrease the overall resistance to pivoting of the arm portion 70. Further, the shape or thickness of one of the end upper and lower support portions 82, 86 may be made differently than the other to provide different biasing force against downward pivoting of the arm portion 70 than upward pivoting of the arm portion 70, for example.

With reference to FIGS. 3 and 8, the frame 50 includes an internal space 91 having an upper portion 92 and a lower portion 94 at least partially filled by the resilient body 38. The internal space upper portion 92 receives the blade mount member arm portion 70 embedded in the body 38 and the internal space lower portion 94 receives the end lower support portion 86 which, in one form, includes a central pad portion 96 and spaced lateral pad portions 151, 153 (see FIG. 7). The pad portions 96, 151, 153 are disposed between the lower surface 88 of the blade mount member arm portion 70 and the angle bracket upper surface 130 (see FIG. 1) with the cleaner unit 20 secured to the right angle bracket 52. As the arm portion 70 pivots downwardly in direction 120 toward the angle bracket upper surface 130, the arm portion 70 compresses the pad portions 96, 151, 153 against the angle bracket upper surface 130 such that the pad portions 96, 151, 153 apply biasing forces in upward direction 120 against the arm portion 70 which resists further pivoting of the arm portion 70.

Figure 7:
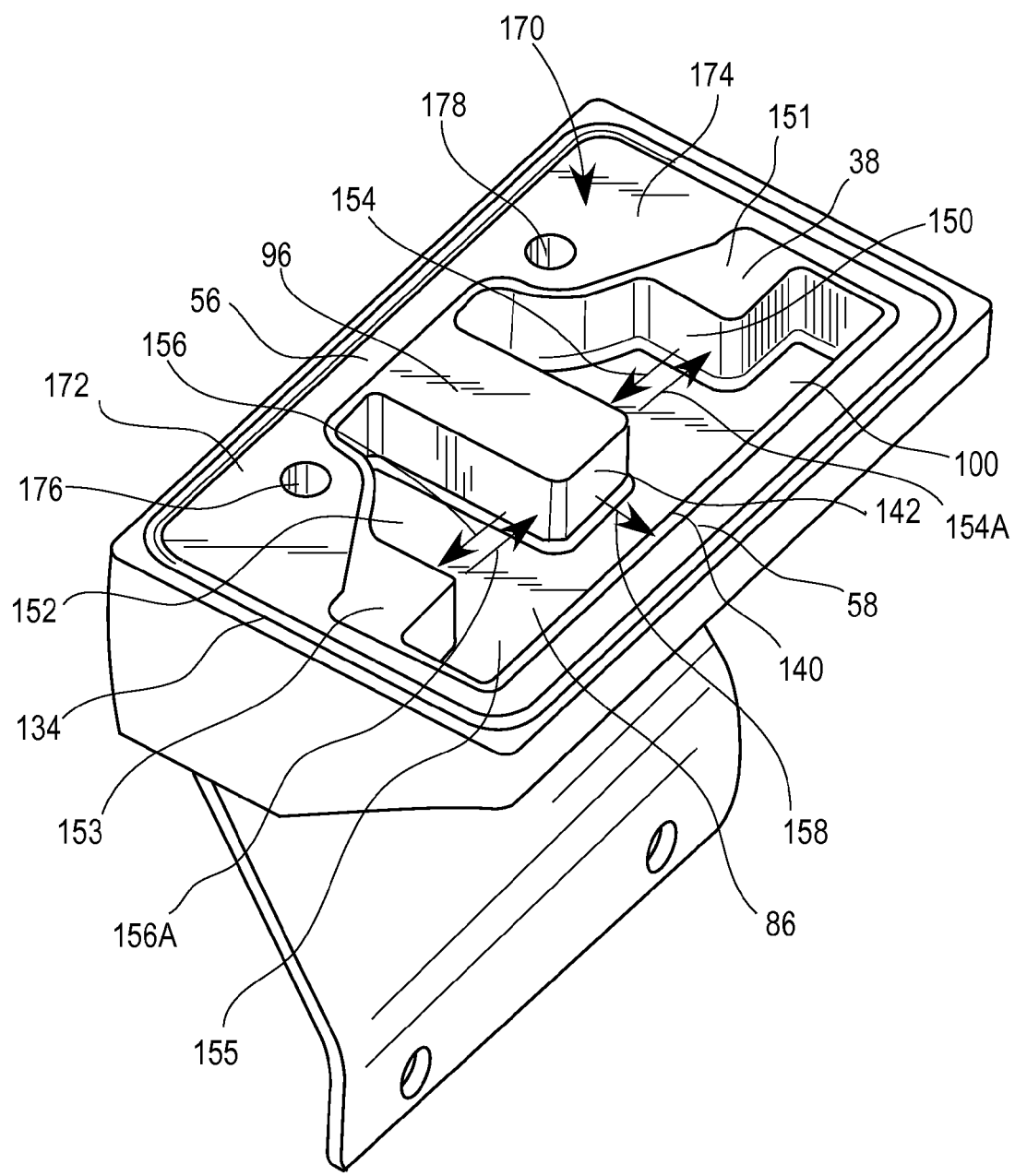
FIG. 7 is a bottom perspective view of the cleaner unit of FIG. 6 showing a recess cavity in the bottom of the resilient body which provides space for the material of the resilient body to deform during movement of the blade mount member.

With reference to FIG. 7, the resilient body 38 also includes one or more recesses 100 at an underside of the end lower support portion 86. The one or more recesses 100 are sized and arranged to provide a desired rigidity to the resilient body 38. In general terms, the larger the one or more recesses 100, the less material present in the end lower support portion 86 of the body 38 that can press against the angle bracket upper surface 130 and resist downward pivoting of the blade mount member arm portion 70. Further, the one or more recesses 100 provide space for the material of the resilient body 38 to deform as the blade mount member arm portion 70 pivots downwardly in response to deflection of the layback portion 64. In one form, the one or more recesses 100 include channels 150, 152, 155 extending along sides of the pad portions 96, 151, 153. The material of the pad portions 96, 151, 153 can thereby deform outwardly in directions 154, 154A, 156, 156A, and 158 into the channels 152, 154, 155 as the arm portion 70 pivots downwardly as discussed in greater detail below.

In addition to the shape of the body 38 being configured to provide a desired rigidity and performance of the body 38, the material of the body 38 may be selected for a particular application. For example, the body 38 may be made of an elastomer such as rubber. In some heavier-duty applications the resilient body 38 may be made of neoprene or nitrile rubber having a 30 shore-A hardness. For high-temperature applications, the resilient body 38 may be made from a silicone rubber to resist the high temperatures and resist melting or softening in high temperature conveyor belt operations. The frame 50 may be made of a metal, such as steel or ductile cast iron, although another rigid, high-strength materials may be used.

With reference to FIGS. 3-5A, the internal operation of the cleaner unit 20 is described in greater detail below including a configuration immediately before a metallic splice 160 impacts the scraper blade 22, an intermediate, deflected configuration shortly after the metallic splice 160 impacts the scraper blade 22 and the cleaner unit 20 permits the scraper blade 22 to resiliently deflect out of the way of the splice 160, and at a final, maximum deflection configuration of the cleaner unit 20 where the scraper blade 22 has been deflected backward and down to its farthest position and before the cleaner unit 20 shifts the scraper blade 22 back toward its undeflected position in engagement with the conveyor belt 12.

Figure 3B:
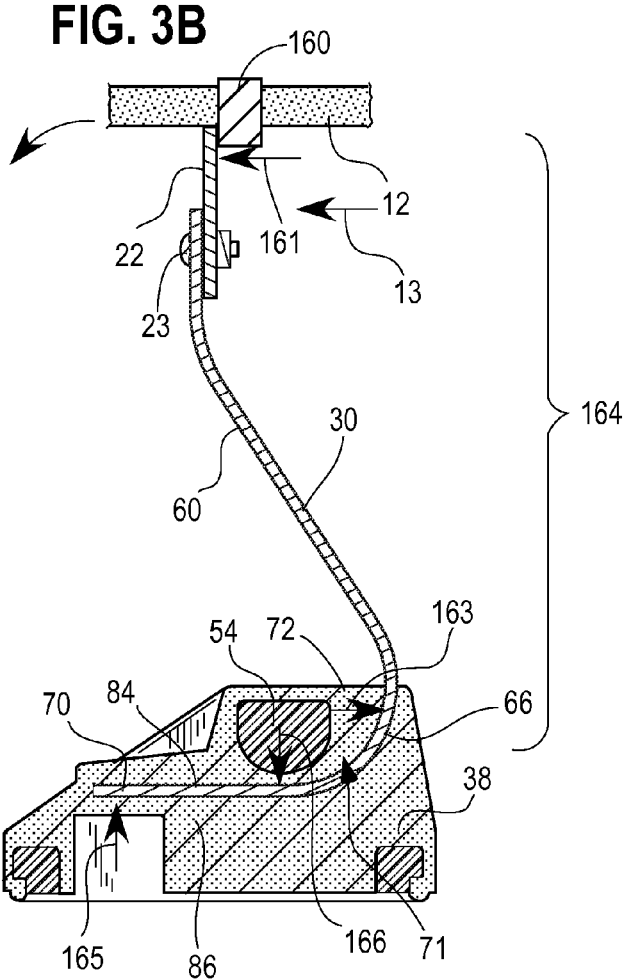
FIG. 3B is a cross-sectional view similar to FIG. 3 showing a schematic representation of a conveyor belt splice contacting the scraper blade.

As shown in FIG. 3, the layback portion 64 of the blade mount member 30 is initially in an undeflected position with the upwardly turned section 61 orienting the scraper blade 22 into engagement with the conveyor belt 12 at a substantially ninety-degree angle. As shown in FIG. 3B, the resilient body 38 is also generally in the undeformed configuration thereof with the arcuate portion 66 of the blade mount member 30 in an initial position relative to the cross bar 54. Further, the thicker section 79A of the fulcrum portion 72 of the body 38 has its initial, substantially undeflected thickness 79A. It is noted that there may be some deflection in the body 38 due to the friction of the scraper blade 22 against the belt 12 while the conveyor belt 12 travels in direction 13 past the scraper blade 22. For convenience, the following discussion refers to this steady-state deformation of the body 38 to be undeflected whereas the impact of a conveyor belt imperfection against the scraper blade 22 is described as deforming the resilient body 38.

With reference to FIG. 3B, a simplified schematic representation of the cleaner unit 20 is provided that illustrates the loading on the components of the cleaner unit 20 at the moment the splice 16 impacts the scraper blade 22 in belt travel direction 13. The impact of the splice 16 against the scraper blade 22 creates a force in a downstream direction 161 against the upper tip of the scraper blade 22 and urges the scraper blade 22 in direction 161. Because the scraper blade 22 is fixed to the blade mount member upwardly turned section 61, the force acting in direction 161 also urges the blade mount member 30 and arcuate portion 66 thereof in the direction 161 downstream against the fulcrum portion 72. This compresses the fulcrum portion 72 of the resilient body 38 between the arcuate portion 66 and the cross bar 54. The urging of the blade mount member arcuate portion 66 in direction 161 toward the cross bar 54 causes the cross bar 54 to produce a reactionary or counterbalancing force in direction 163 against the arcuate portion 66 via the resilient body fulcrum portion 72. The frame 50 and cross bar 54 thereof are sufficiently rigid to resist downstream movement of the blade mount member 30. Although the reactionary force from the cross bar 54 in direction 163 resists downstream movement of the blade mount member 30, the splice impact force in direction 161 at the scraper blade 22 acts along a moment arm 164 from the dynamic pivot point 71 and generates pivoting or rocking of the blade mount member 30 including the arm portion 70 thereof about the cross bar 54.

As shown in FIG. 3B and FIG. 4, the pivoting or rotation of the blade mount member 30 about the cross bar 54 pivots the arm portion 70 downward in direction 120 against the end support lower portion 86 of the resilient body 38. The downward pivoting of the arm portion 70 compresses the pad portions 96, 151, 153 of the end support lower portion 86 between the arm portion 70 and the upper surface 130 of the angle bracket 52. In response to this compression, the pad portions 96, 151, 153 produce an upwardly directed biasing force in direction 165 which resists the downward pivoting of the arm portion 70 as the blade mount member 30 rocks about the cross bar 54. The compression of the pad portions 96, 151, 153 also places a neck portion 97 (see FIG. 4A) of the resilient body 38 in tension and causes an upper wall 144 of the end lower support portion 86 to deflect into the channel 155 of the recess 100. Further, an outer vertical wall 140 and an inner vertical wall 142 of the pad portion 97 deflect apart to permit the upper wall 144 to deflect into the channel 155.

With reference to FIG. 4, the cleaner unit 20 is shown at an intermediate configuration shortly after the metallic splice 160 has impacted the scraper blade 22. The impact from the splice 160 shifts the layback portion 64 downward and backward and causes the arcuate portion 66 to flex and rock upward and toward the cross bar 54. Specifically, the radius of curvature of the arcuate portion 66 decreases and the arcuate portion 66 moves upward and about the cross bar 54.

As shown in FIG. 4A, the rocking of the arcuate portion 66 upwardly and around the cross bar 54 compresses the fulcrum portion 72 of the resilient body 38 between the arcuate portion 66 and the cross bar 54. This decreases the thickness of the thicker region 79 of the fulcrum portion 72 to a partially deflected thickness 79B. This compression between the arcuate portion 66 and the cross bar 54 causes the material of the fulcrum portion 72 to bulge outward and form a raised portion 87 extending outwardly from an upper surface 87A of the resilient body 38.

To counterbalance the biasing force in direction 165 produced by the compressed pad portions 96, 151, 153, the cross bar 54 produces a reactionary force in direction 166 (see FIG. 3B) against the upper surface 84 of the blade mount member 30 at the arm portion 70. The reactionary force in direction 166 from the cross bar 54 resists the blade mount member shifting vertically upward in direction 165 from the biasing force produced by the pad portions 96, 151, 153.

Figure 3C:
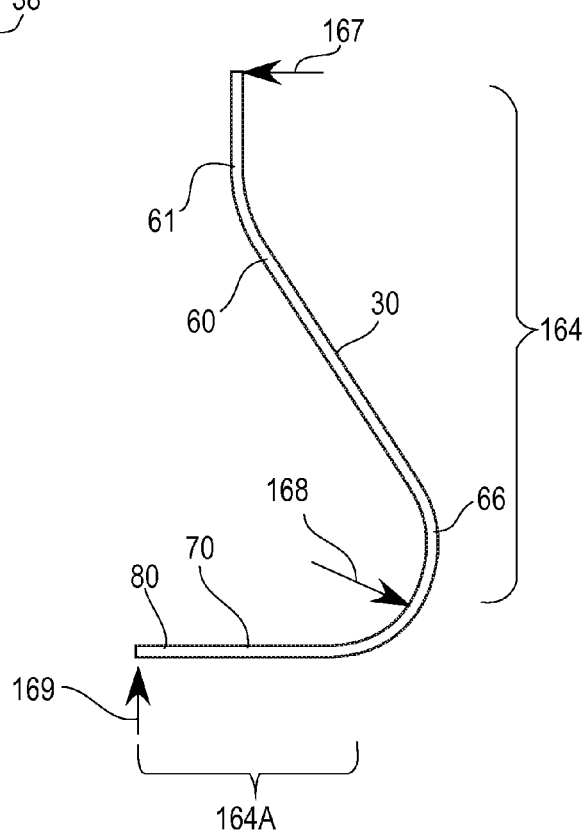
FIG. 3C is a schematic view of the blade mount member of FIG. 3B showing the resulting loads on the upper tip, arcuate portion, and end of an arm portion of the blade mount member resulting from the splice contact shown in FIG. 3B.
Figure 4A:
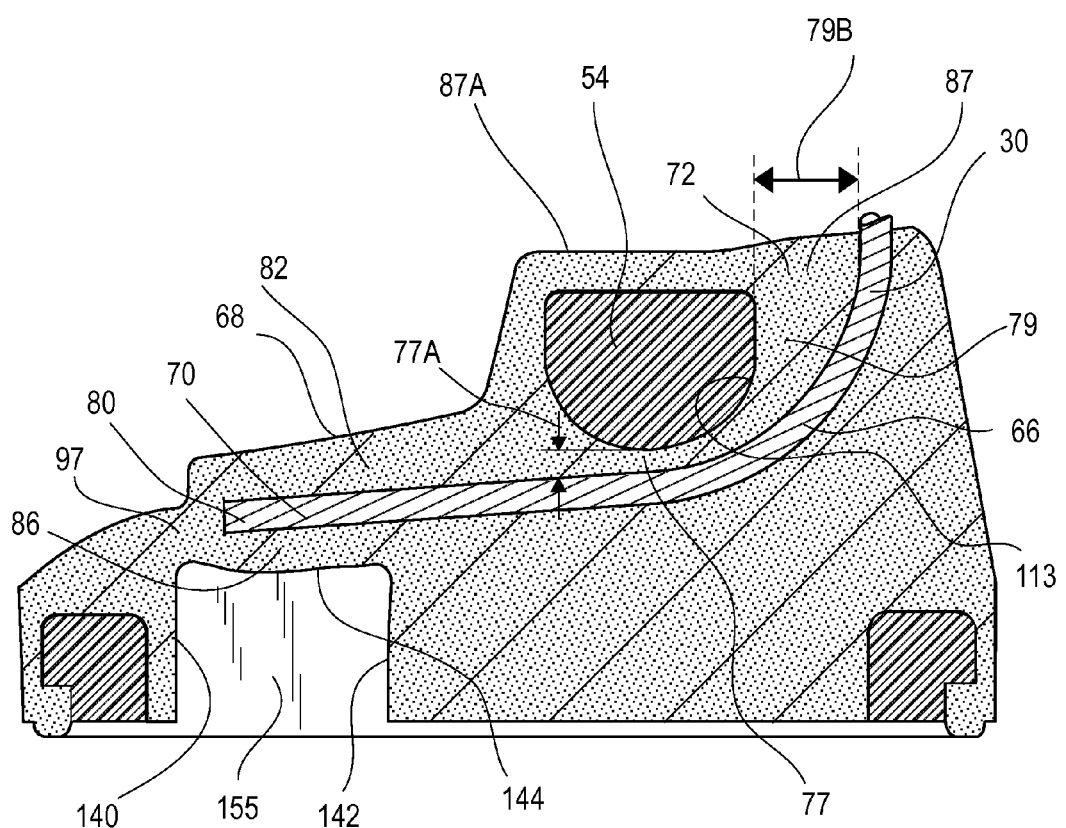
FIG. 4A is an enlarged, cross-sectional view of a portion of the cleaner unit of FIG. 4 showing the resilient body in a partially deflected configuration.

With reference to FIG. 3C, the loading in directions 161, 163, 166, and 165 combine to result in a splice load in direction 167 at the upturned portion 61, a cross beam load in direction 168 at the arcuate portion 66, and a pad biasing load in direction 169 at the end 80 of the blade mount member 30. The blade mount member 30 forms a lever arm 164 from the dynamic pivot point 71 for the splice load acting in direction 167 and a lever arm 164A from the dynamic pivot point 71 for the pad biasing load acting in direction 169. The sizing of the lever arms 164, 164A and the magnitudes of the loading in directions 167, 169 create moment arms on the blade mount member 30 which cooperate to cause the upturned portion 61 to deflect backward and down, the arm portion 70 to pivot downward, and the arcuate portion 66 rocking upward about the cross beam 54. It will be appreciated that the loading is shown in FIG. 3C as point loading for discussion purposes. The real-world operation of the blade mount member 30 will include distributed loads over the different areas of the blade mount member 30 which will change throughout the movement of the blade mount member 30.

With reference to FIGS. 5 and 5A, the cleaner unit 20 is shown at a final, fully deflected configuration where the blade mount member 30 has deflected its maximum amount from the impact of the conveyor belt splice permitted by the resilient body 38 and the resilient body 38 thereafter begins to return the blade mount member 30 toward its undeflected configuration, e.g., FIG. 3. The rocking of the arcuate portion 66 from its partially deflected position in FIG. 4A toward its fully deflected position in FIG. 5A compresses the thicker region 79 of the base arcuate portion 72 even farther to a fully compressed thickness 79C. Here, the material of the resilient body 38 resists any further compression of the thicker region 79 and urges against the arcuate portion 66 to return the arcuate portion 66 toward its undeflected position.

With reference to FIG. 5A, the downward pivoting of the arm portion 70 from its position in FIG. 4A to its position in FIG. 5A deflects the upper wall 144 farther into the channel 155 which deflects the vertical walls 142, 140 farther apart. At the fully deflected position of FIG. 5A, the end lower support portion 86 and the pad portions 96, 151, 153 thereof are compressed as far as they will compress from the force of the impact from the conveyor belt splice 160. At this juncture, the biasing force created by the deflected lower support portion 86 begins to urge the arcuate portion 66 and the arm portion 70 back toward their undeflected positions, e.g., FIG. 3.

Another aspect that occurs generally concurrently with the blade mount member 30 reaching its fully deflected position of FIGS. 5 and 5A is that the arcuate portion 66 achieves its smallest radius of curvature from the impact of the splice 160 against the scraper blade 22. The resilient properties of the blade mount member 30 then begin to overcome the flexing of the arcuate portion 66 caused by the deflecting layback portion 64 and expand the arcuate portion 66 back toward its undeflected radius of curvature.

Figure 6:
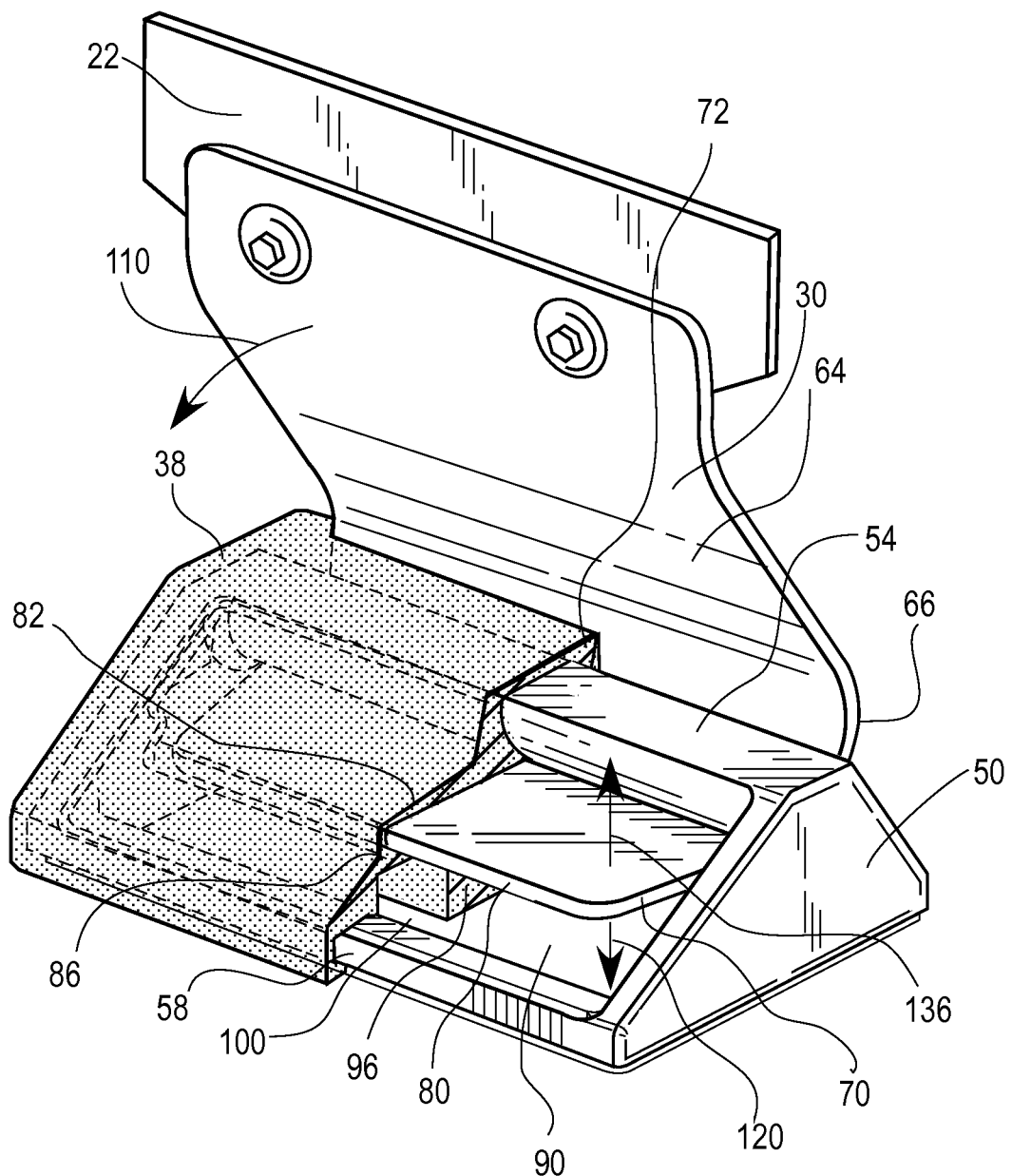
FIG. 6 is a rear perspective, partial cross-sectional view of one of the cleaner units of FIG. 2 showing the resilient body resiliently holding the arm portion of the blade mount member relative to an upper cross bar and lower support member of the frame.

With reference to FIGS. 6 and 7, the end lower support portion 86 and the pad portions 96, 151, 153 thereof are formed in the cavity lower portion 94 of the frame 50 below the arm portion 70 of the blade mount member 30. The frame 50, and thereby the cleaner unit 20, is releasably secured to the right angle bracket 52 of the pole member 18 using bolts 53 threaded from below the angle bracket 52 into threaded openings 176, 178 of the frame 50. With reference to FIG. 7, the body 38 has a lip 134 extending about the lower periphery of the body 38 that seats against and engages angle bracket upper surface 130. As the bolts 53 are tightened, the bolts 53 draw the frame 50 toward the angle bracket upper surface 130. Because the frame 50 is embedded in the body 38, drawing the frame 50 toward the angle bracket upper surface 130 brings the lower lip 134 into engagement with the upper surface 130. The engagement between the body lower lip 134 and the angle bracket upper surface 130 may form a seal therebetween to resist the ingress of fugitive material between the body 38 and the right angle bracket 52. In one form, the body 38 is made of nitrile rubber having a hardness of 30 shore A, the angle bracket 52 is made of steel, and the lip 134 extends continuously around the lower end of the body 38 such that the lip 134 forms a particulate and water-resistant seal between the body 38 and the right angle bracket 52.

With reference to FIGS. 6 and 7, the cavity 90 of the frame 50 is sized to permit the arm portion 70 of the blade mount member 30 to generally pivot upwardly and downwardly in directions 120, 136 and the end upper and lower support portions 82, 86 resist this movement. The end 80 of the blade mount member 30 pivots in direction 120 toward and into the lower portion 94 of the frame cavity 90 in response to the blade mount member layback portion 64 deflecting in direction 110 from a conveyor splice impact with the scraper blade 22.

With reference to FIG. 7, the body 38 has a series of structures defining the recess 100 which are configured to provide a desired behavior of the blade mount member 30 after impact from a conveyor belt splice. For example, the body 38 may have the somewhat narrow central pad portion 96 with the channels 150, 152 extending on either side of the central pad portion 96 and the lateral pad portions 151, 153 spaced from the central pad portion 96 by the channels 150, 152. The channels 150, 152 permit the central pad portion 96 to deflect laterally in directions 154, 156 and the lateral pad portions 151, 153 to deflect laterally in directions 154A, 156A into the channels 150, 152 as the blade mount member arm portion 70 pivots downwardly in direction 120 after an impact from a conveyor belt splice. Further, the recess 100 permits the central pad portion 96 and the lateral pad portions 151, 153 to deflect longitudinally in direction 158 into the channel 155. Thus, the recess 100 provides sufficient room for the pad portions 96, 151, 153 to deflect as they are compressed by the arm portion 70 of the blade mount member 30. Additionally, the recess 100 effectively removes material from underneath the arm portion 70 of the blade mount member 30. This reduces the resistance of the body 38 to pivoting of the arm portion 70 in direction 120. The configuration of the body 38 and the recess 100 thereof may be varied to provide varying amounts of resistance to deflection to the arm portion 70.

With reference to FIG. 7, the frame 50 has an attachment portion 170 including mounting plates 172, 174 with threaded openings 176, 178. The openings 176, 178 are sized and positioned on the frame 50 to be aligned with corresponding openings on the right angle bracket 52 (see FIG. 1). Once the cleaner unit 20 is positioned on the right angle bracket 52, the bolts 53 may be advanced into the openings of the right angle bracket 52 and threaded into the openings 176, 178. Tightening of the bolts draws the frame 50 including the front and rear supports 56, 58 thereof against the right angle bracket upper surface 130. This compresses the lip 134 of the body 38 against the right angle bracket 52 and forms a tight engagement between the body 38 and the right angle bracket upper surface 130.

With respect to FIGS. 9 and 10, the frame 50 has an upper portion 186 for controlling movement of the blade mount member 30 and a lower portion 188 for being secured to a support, such as the support assembly 14. In one form, the frame upper portion 186 includes the cross bar 54 and the frame lower portion 188 includes the front and rear supports 56, 58. The frame 50 also has risers, such as walls 190, 192, for positioning the cross bar 54 above the lower portion 188. With reference to FIG. 10, the walls 190, 192 position the cross bar 54 a vertical distance 200 above the front and rear supports 56, 58. The distance 200 is sized to form an opening 202 below the cross bar 54 that permits the arm portion 70 of the blade mount member 30 to be advanced therethrough and permits pivoting of the arm portion 70 during operation of the cleaner unit 20, as discussed above.

The scraper blade 22 may be connected to the blade mount member 30 in a number of ways, such as being permanently fastened to the blade mount member 30 via welds or rivets. In another approach, the scraper blade 22 is removably connected to the blade mount member 30 with bolts 23 and nuts 25 which permits the scraper blade 22 to be replaced, as shown in FIG. 3.

Figure 11:
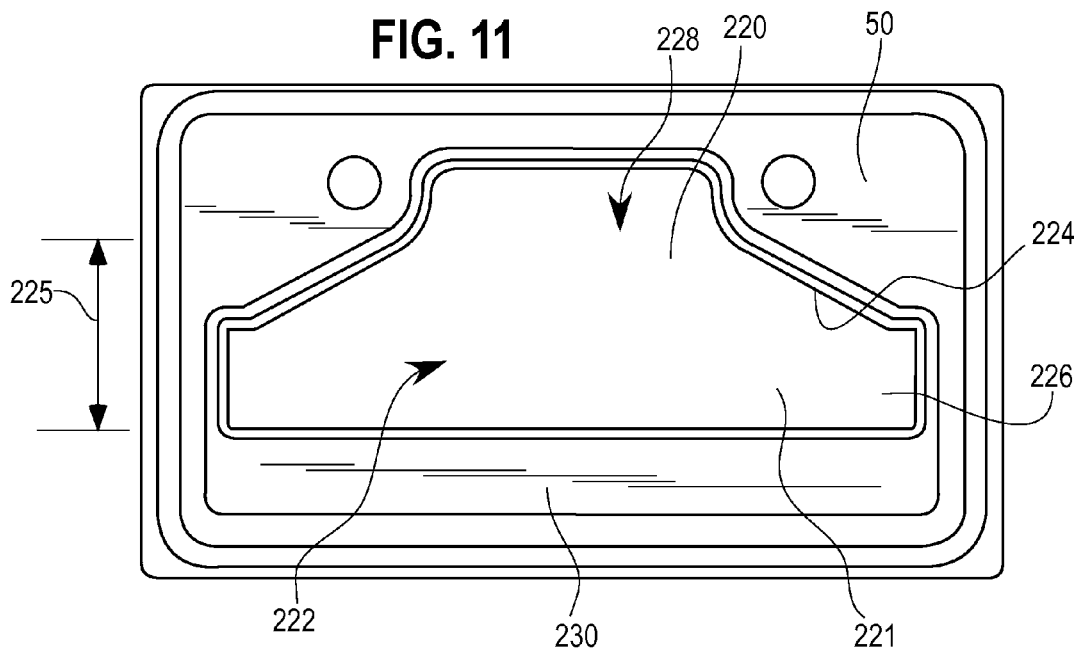
FIG. 11 is a bottom plan view of another resilient body and frame showing a recess cavity in an underside of the resilient body that is differently shaped than the cavity of the resilient body of FIG. 7.

With reference to FIG. 11, an alternative embodiment of a resilient body 220 is shown that may be used with the frame 50 and blade mount member 30 discussed above. The body 220 is similar to the body 38 such that differences between the two will be discussed. Like the body 38, the body 220 has an end lower support portion 221 including a recess 222 with vertical walls 224 and an upper wall 226 that are deflected into the recess 222 with downward pivoting of the arm portion 70 in direction 110 (see FIG. 6). The recess 222, however, has a different shape than the recess 100. Specifically, the body 220 does not have a central pad portion 96 and lateral pad portions 151, 153 disposed below the arm portion 70 of the blade mount member 30 below the cross bar 54. Rather, the end lower support portion 221 has an outboard pad portion 230 spaced a distance 225 downstream from the cross bar 54 and the blade mount member end 80 is aligned vertically above the outboard pad portion 230. Downward pivoting of the blade mount member arm portion 70 due to a conveyor belt splice impact against the scraper blade 22 shifts the blade mount member end 80 downward against the outboard pad portion 230 and compresses the outboard pad portion 230 between the end 80 and the right angle upper surface 130. Because the outboard pad portion 230 is spaced from the cross bar 54 by distance 225 rather than extending below the cross bar 54 (compare pad portions 96, 151, 153 in FIGS. 3 and 7), the outboard pad 230 creates a longer moment arm for the arm portion 70 than the pad portions 96, 151, 153. Thus, the biasing force of the outboard pad portion 230 against the arm portion 70 is magnified by the longer moment arm and creates a greater moment on the blade mount member 30. The body 220 is therefore more rigid than the pad 38 because the outboard pad portion 230 creates a larger moment on the blade mount member 30 to urge the blade mount member 30 back toward its undeflected position than the pad portions 96, 151, 153.

Figure 12:
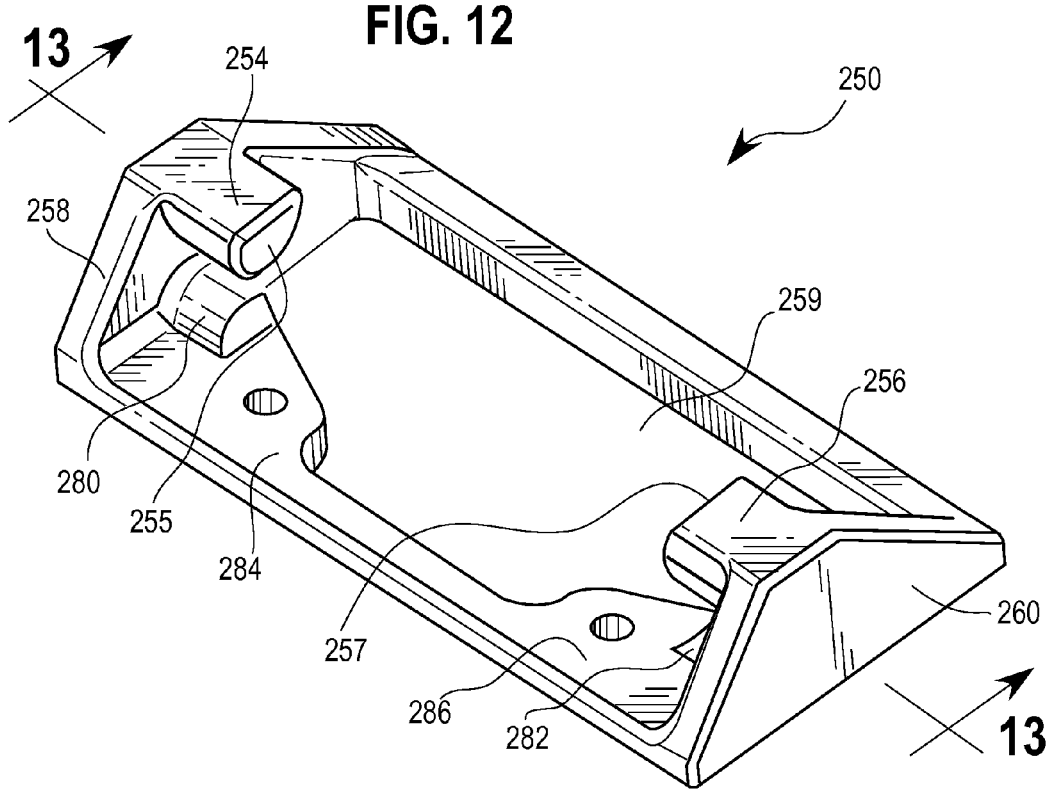
FIG. 12 is a perspective view of another frame showing a pair of cross bars of the frame spaced apart from one another.
Figure 13:
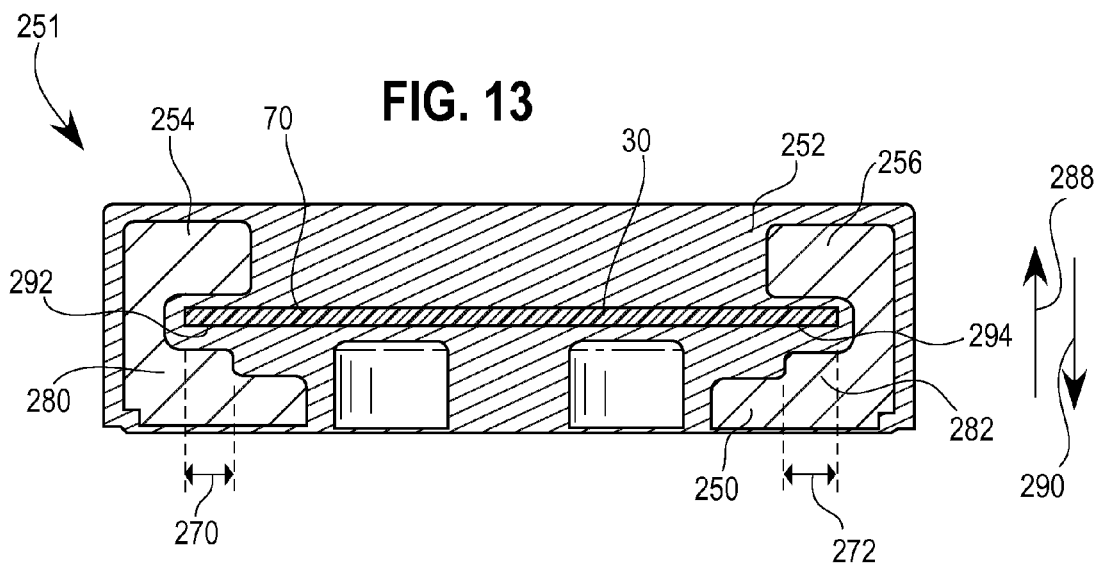
FIG. 13 is a cross-sectional view taken across line 13-13 in FIG. 12 showing the frame embedded in a resilient body and the cross bars extending above laterally outer sections of the blade mount member also embedded in the resilient body.

With reference to FIGS. 12 and 13, another frame 250 is shown that may be used with the blade mount member 30 and a body 252 which is similar to the body 38 discussed above. The frame 250, blade mount member 30, and the body 252 may form a cleaner unit 251 that operates in a manner similar to the cleaner unit 20. Further, the frame 250 is similar in many respects to the frame 50 such that differences between the frames 50, 250 will be discussed. One difference is that the frame 250 includes a pair of cross bars 254, 256 extending from walls 258, 260 of the frame 250. The cross bars have ends 255, 257 separated by a gap 259. The spaced bars 254, 256 operate similarly to the cross bar 54 and resist pull-through of the blade mount member 38 and permit the spring blade mount member 38 to rock upwardly and about the bars 254, 256.

More specifically, the arcuate portion 66 of the spring blade mount member 30 extends about the bars 254, 256 and the arm portion 70 of the spring blade mount member 30 extends below the arms 254, 256, as shown in FIG. 13. Although the cross bars 254, 256 do not extend all the way across the arm portion 70 of the blade mount member 30, there is sufficient overlap 270, 272 of the cross bars 254, 256 along side portions of the spring blade mount member 30 to resist pull through of the blade mount member 30 from the resilient body 252 (see direction 111 in FIG. 5). The frame 250 and spaced bars 254, 256 thereof may be desirable in some applications to make molding of the body 38 on the frame 250 and the blade mount member lower portion 69 and the cross bar 54 less complicated. Specifically, the spaced cross bars 254, 256 make the molding process easier because there are fewer enclosed features on the frame 250 and blade mount member lower portion 269 so that the mold used to form the body 38 may be less complicated.

One similarity between the frames 50, 250 is that the frame 50 has a pair of rounded protrusions 194, 196 extending upwardly from mounting plates 172, 174, as shown in FIG. 9. Likewise, the frame 250 has rounded protrusions 280, 282 extending upward from mounting plates 284, 286 as shown in FIG. 12. The protrusions 194, 196 and 280, 282 provide rigid supports for the blade mount member 30 when the cleaner assembly is initially tensioned against the conveyor belt 12 and will be discussed by reference to the protrusions 280, 282 and FIG. 13.

When the cleaner unit 251 including the spring blade 30, the frame 250, and the body 252 is initially urged in direction 288 against the conveyor belt 12 prior to operation of the conveyor belt, the scraper blade 22 contacts the conveyor belt 12 and causes the blade mount member 30 to shift downwardly in direction 290. This seats lower, laterally outward surfaces 292, 294 of the blade mount member 30 against the protrusions 280, 282 with thin sections of the resilient body 252 sandwiched between the surfaces 292, 294 and the protrusions 280, 282. The blade mount member 30 is thereby rigidly supported by the protrusions 280, 282 so that the blade mount member 30 does not further compress the resilient body 252 despite continued tensioning of the scraper blade 22 against the conveyor belt 12. This may reduce the opportunity for material creep in the resilient body 252 if the conveyor belt 12 is turned off for extended periods of time. Another advantage of the protrusions 280, 282 against the blade mount member 30 is that the rigid support of the protrusions 280, 282 can resist tension in the event that the cleaner unit 251 is over-tensioned, either intentionally or by accident, against the conveyor belt 12. In this situation, the blade mount member 30 seats against the protrusions 280, 282 with thin sections of resilient body of the resilient body 252 sandwiched between the surfaces 292, 294 and the protrusions 280, 282. This transmits at least some of the over-tension through the frame 250 and into the angle bracket 52 rather than applying the over-tension entirely through the resilient body 252 which may be undesirable. In another approach, the resilient body 252 may be configured to permit the outward surfaces 292, 294 of the blade mount member 30 to seat directly against the protrusions 280, 282.

With continued reference to FIG. 13, the conveyor belt 12 begins to operate with the scraper blade 22 tensioned thereagainst. The frictional engagement between the scraper blade 22 and the conveyor belt 12 partially deflects the layback portion 64 of the blade mount member 30 which rocks the arcuate portion 66 toward and about the bars 252, 254 (see direction 110 in FIG. 4). The upward rocking of the arcuate portion 66 lifts the arcuate portion 66 and arm portion 70 extending downstream therefrom upward so that the lower, laterally outer surfaces 292, 294 of the blade mount member 30 are spaced from the protrusions 280, 282 a distance sufficient to avoid contact therebetween during conveyor belt operations. The upward rocking of the arcuate portion 66 also permits the thin sections of the body 252 sandwiched between the surfaces 292, 294 and the protrusions 280, 282 to partially unload.

With reference to FIGS. 3 and 6, the lower portion 69 of the blade mount member 30 and the cross bar 54 of the frame 50 may be embedded in the resilient body 38 using various molding techniques. For example, the blade mount member 30 and frame 50 may be prepped, such as by sandblasting and spraying with adhesive. The blade mount member 30 and frame 50 are then secured in fixtures of a mold to maintain the blade mount member 30 and frame 50 in a predetermined orientation. Molten material for the body 38 is injected into the mold and engages the prepped surfaces of the blade mount member 30 and the frame 50. The molten material of the body 38 cures, thereby resiliently securing the blade mount member 30 and the frame 50 in the predetermined orientation in the body 38. Although the frame cross bar 54 and the blade mount member lower portion 69 are illustrated completely embedded within the resilient body 38, in some embodiments, the blade mount member lower portion 69 and the cross bar 54 may be partially or completely exposed and not covered by the body 38.

Figure 14:
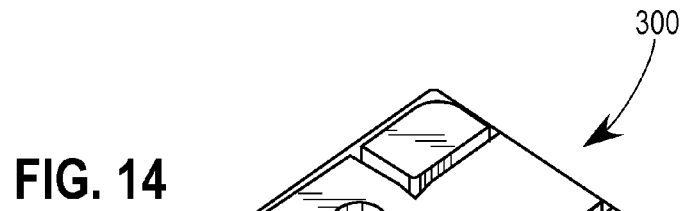
FIG. 14 is a perspective view of another frame showing channels formed in the frame for mold locking with a resilient body molded to the frame.

With reference to FIG. 14, another frame 300 is provided that is similar in many respects to the frame 50 and offers further simplified manufacture. The frame 300 has a lower portion 302 with mold lock features 304 that improve bonding of the resilient body 38 to the frame 300 during molding. With the mold lock features 304, the frame 300 may not need to be sandblasted and sprayed with adhesive prior to the molding of the body 38 onto the frame 300. For example, the mold lock features 304 may include channels 306 and blind or through bores 307 formed in the lower surface 308 of the frame 300. The channels 306 and bores 307 provide areas for the material of the body 38 to flow into and become engaged therewith upon curing of the material of the body 38. Thus, the frame 300 when used with the body 38 and the blade mount member 30 can offer streamlined manufacture and reduced cost. It will, however, be appreciated that sandblasting and adhesive may be used in conjunction with mold lock features 304 to further enhance bonding of the resilient body 38 to the frame 300.

Figure 15:
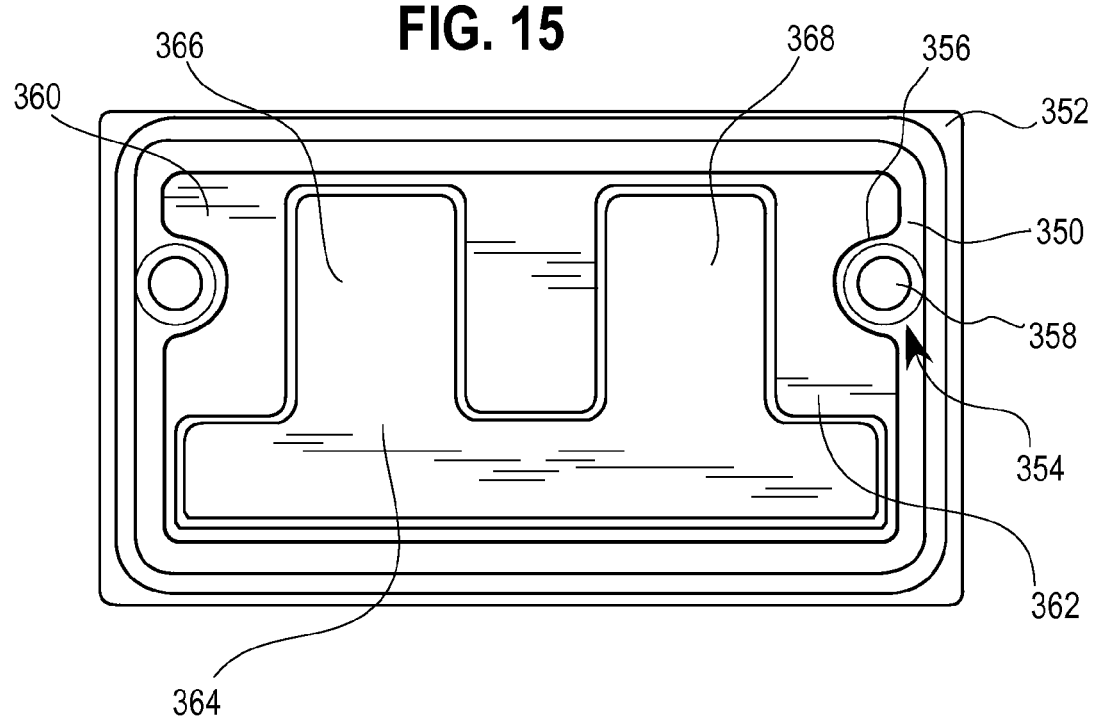
FIG. 15 is a bottom plan view of another resilient body molded to a frame showing a differently shaped recess cavity than the cavities of the previous resilient bodies.

With reference to FIG. 15, another frame 350 and a body 352 are shown that are substantially similar to the frame 50 and body 38 discussed above. The frame 350 is different than the frame 50 because the frame 350 includes a different attachment portion 354 with a pair of lobes 356 rather than the generally trigonal shaped mounting plates 174, 176. The attachment portion 354 further includes openings 358 that may be threaded to receive the bolts 53. In another form, the openings 358 are replaced with threaded studs that can be advanced through openings in the right angle bracket 52 of the pole 18 and secured thereto using nuts threaded onto the studs.

Another difference between the body 352 and the body 38 is that the body 352 includes lateral pad portions 360, 362 that are more exposed than the lateral pads 151, 153 of the body 38 such that a greater surface area of the lateral pad portions 360, 362 may be compressed against the angle bracket upper surface 130 (see FIG. 7). The greater exposure of the lateral pads 360, 362 may be attributed to the smaller, lobes 156 that obscure less of the footprint of the body 38. Another difference is that the body 352 has a recess 364 with generally rectangular channels 366, 368. The channels 366, 368 may be wider than the channels 150, 152 of the body 38 which positions less material of the body 352 to be compressed between the blade mount member arm portion 70 and the angle bracket upper portion 130. Because there is less material positioned below the arm portion 70, the body 352 may provide less resistance to pivoting of the arm portion 70 in direction 120 than the body 38.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A cleaner for a conveyor belt, the cleaner comprising:
a scraper blade for engaging a conveyor belt traveling in a downstream travel direction;
a rigid fulcrum member extending laterally transverse to the downstream direction;
a blade mount member movable relative to the rigid fulcrum member;
an upper arm portion of the blade mount member connected to the scraper blade;
an intermediate portion of the blade mount member spaced upstream from the rigid fulcrum member;
a lower arm portion of the blade mount member extending from the intermediate portion, under the rigid fulcrum member, and downstream beyond the rigid fulcrum member; and
a resilient support for the blade mount member configured to allow the blade mount member to resiliently rock about the rigid fulcrum member as the scraper blade is impacted during conveyor belt operations.

2. The cleaner of claim 1 wherein the lower arm portion includes a lower surface and the resilient support includes a lower portion extending along the lower surface of the lower arm portion to resist downward pivoting of the arm portion.

3. The cleaner of claim 1 wherein the resilient support includes an upper portion extending between the blade mount member intermediate portion and the fulcrum member that compresses as the blade mount member resiliently rocks about the fulcrum member.

4. The cleaner of claim 1 wherein the resilient support includes a molded resilient body with the fulcrum member and the lower arm portion of the blade mount member being embedded in the molded resilient body.

5. The cleaner of claim 4 wherein at least a portion of the intermediate portion of the blade mount member is embedded in the molded resilient body.

6. The cleaner of claim 1 wherein the resilient support includes an upper biasing portion disposed above the blade mount member and a lower biasing portion disposed below the blade mount member.

7. The cleaner of claim 6 wherein the upper biasing portion includes a fulcrum portion extending between the fulcrum member and the intermediate portion of the blade mount member.

8. The cleaner of claim 1 wherein the blade mount member comprises a unitary metallic member that includes the upper arm portion, intermediate portion, and the lower arm portion.

9. The cleaner of claim 1 wherein the blade mount member comprises a spring plate including the upper arm portion, intermediate portion, and lower arm portion;
the intermediate portion includes an arcuate portion extending about the rigid fulcrum member; and
the lower arm portion and at least a portion of the arcuate portion are embedded in the resilient support.

10. The cleaner of claim 1 wherein the blade mount member intermediate portion has a width extending laterally transverse to the downstream direction and the rigid fulcrum member has a width extending laterally transverse to the downstream direction that is greater than the width of the blade mount member intermediate portion.

11. The cleaner of claim 1 wherein the resilient support includes a rubber material.

12. A conveyor belt cleaner system including an elongate support, a pair of mounts for supporting opposite ends of the elongate support, and a plurality of cleaners of claim 1 for being connected to the elongate support.

13. A conveyor belt cleaner comprising:
a rigid base for being mounted to a support;
a blade support member having a lower portion for being connected to the rigid base;
a resilient body of resilient material molded in situ with the rigid base and the blade support member so that both the rigid base and the blade support member are molded to the same resilient material, the same resilient material of the molded body extending about the rigid base and the lower portion of the blade support member with the blade support member lower portion completely embedded in the molded body; and
an upper portion of the blade support member extending above the molded body for supporting a scraper blade and being movable relative to the rigid base during conveyor belt operations.

14. The conveyor belt cleaner of claim 13 wherein the rigid base includes a fulcrum member and the resilient molded body includes a fulcrum portion extending between the base fulcrum member and the blade support member lower portion.

15. The conveyor belt cleaner of claim 13 wherein the lower portion of the blade support member includes an end portion embedded in the molded body and the resilient molded body resists movement of the blade support member end portion relative to the rigid base.

16. The conveyor belt cleaner of claim 13 wherein the rigid base includes an upper portion with a fulcrum member and a lower portion with one or more supports and the resilient molded body extends along the rigid base from the upper portion to the lower portion.

17. The conveyor belt cleaner of claim 13 wherein the resilient molded body includes a lower peripheral portion extending about a lower end portion of the frame and a lower lip depending below the lower peripheral portion for engaging the support and resisting passage of fugitive material between the resilient molded body and the support.

18. The conveyor belt cleaner of claim 13 wherein the rigid base includes a plurality of mold lock features configured to encourage adherence of the resilient molded body to the rigid base.

19. The conveyor belt cleaner of claim 13 wherein the resilient body comprises a rubber material.

20. The conveyor belt cleaner of claim 13 wherein the resilient body comprises an elastomer material.

21. A conveyor belt cleaner comprising:
a rigid base for being mounted to a support;
a blade support member having a lower portion for being connected to the rigid base;
a resilient body molded in situ with the rigid base and the blade support member, the molded body extending about the rigid base and the lower portion of the blade support member with the blade support member lower portion completely embedded in the molded body; and
an upper portion of the blade support member extending above the molded body for supporting a scraper blade and being movable relative to the rigid base during conveyor belt operations,
wherein the rigid base includes a fulcrum member, the resilient molded body includes a fulcrum portion extending between the base fulcrum member and the blade support member lower portion, the blade support member lower portion includes an arcuate portion extending about the fulcrum member, and the fulcrum portion of the resilient body extends between the fulcrum member of the rigid base and the arcuate portion of the blade support member.

22. A cleaner for a conveyor belt, the cleaner comprising:
a scraper blade for engaging a conveyor belt;
a rigid base including a fulcrum member that is fixed relative thereto during conveyor belt operation with the scraper blade engaged with the conveyor belt;
a blade mount member having an upper portion connected to the scraper blade and a lower portion extending about the fulcrum member with the blade mount member and fulcrum member permitting deflection of the blade mount member upper portion in response to impacts against the scraper blade; and
a resilient material connected to the blade mount member and including upper and lower biasing portions extending along the blade mount member with the upper biasing portion extending between blade mount member lower portion and the rigid base fulcrum member and the lower biasing portion separated from the fulcrum member by both the upper biasing portion and the blade mount member.

23. The cleaner of claim 22 wherein the upper and lower biasing portions are integrally formed.

24. The cleaner of claim 22 wherein the upper biasing portion has a thickness between the blade mount member lower portion and the rigid base fulcrum member that varies along the blade mount member lower portion.

25. The cleaner of claim 22 wherein the blade mount member lower portion includes an arm portion and the lower biasing member includes a resilient pad portion disposed below the arm portion with the resilient pad portion configured to resist pivoting of the arm portion.

26. The cleaner of claim 22 wherein the resilient material comprises rubber material.

27. A cleaner for a conveyor belt, the cleaner comprising:
a scraper blade for engaging a conveyor belt;
a rigid base including a fulcrum member;
a blade mount member having an upper portion connected to the scraper blade and a lower portion extending about the fulcrum member with the blade mount member and fulcrum member permitting deflection of the blade mount member upper portion in response to impacts against the scraper blade; and
a resilient material connected to the blade mount member and including upper and lower biasing portions extending along the blade mount member with the upper biasing portion extending between blade mount member lower portion and the rigid base fulcrum member and the lower biasing portion separated from the fulcrum member by both the upper biasing portion and the blade mount member,
wherein the rigid base includes one or more lower supports and a window between the fulcrum member and the one or more supports with the blade mount member, upper biasing portion, and lower biasing portion all extending through the window of the rigid base.

28. A cleaner for a conveyor belt, the cleaner comprising:
a scraper blade for engaging a conveyor belt;
a rigid base including a fulcrum member;
a blade mount member having an upper portion connected to the scraper blade and a lower portion extending about the fulcrum member with the blade mount member and fulcrum member permitting deflection of the blade mount member upper portion in response to impacts against the scraper blade; and
a resilient material connected to the blade mount member and including upper and lower biasing portions extending along the blade mount member with the upper biasing portion extending between blade mount member lower portion and the rigid base fulcrum member and the lower biasing portion separated from the fulcrum member by both the upper biasing portion and the blade mount member, wherein the rigid base comprises an upper portion including the fulcrum member and a lower portion having an opening below the lower biasing portion that permits the lower biasing portion to be deflected through the opening and against a support below the rigid frame in response to impacts against the scraper blade.

29. A cleaner for a conveyor belt, the cleaner comprising:
a scraper blade for engaging a conveyor belt;
a rigid base including a fulcrum member;
a blade mount member having an upper portion connected to the scraper blade and a lower portion extending about the fulcrum member with the blade mount member and fulcrum member permitting deflection of the blade mount member upper portion in response to impacts against the scraper blade; and
a resilient material connected to the blade mount member and including upper and lower biasing portions extending along the blade mount member with the upper biasing portion extending between blade mount member lower portion and the rigid base fulcrum member and the lower biasing portion separated from the fulcrum member by both the upper biasing portion and the blade mount member,
wherein the fulcrum member has a curved outer surface and the upper biasing portion encircles the fulcrum member curved outer surface.

30. A cleaner for a conveyor belt, the cleaner comprising:
a scraper blade for engaging a conveyor belt
a rigid base including a fulcrum member;
a blade mount member having an upper portion connected to the scraper blade and a lower portion extending about the fulcrum member with the blade mount member and fulcrum member permitting deflection of the blade mount member upper portion in response to impacts against the scraper blade; and
a resilient material connected to the blade mount member and including upper and lower biasing portions extending along the blade mount member with the upper biasing portion extending between blade mount member lower portion and the rigid base fulcrum member and the lower biasing portion separated from the fulcrum member by both the upper biasing portion and the blade mount member,
wherein the blade mount lower portion includes an arcuate portion disposed upstream of the rigid base fulcrum member and an arm portion connected to the arcuate portion and extending downstream of the fulcrum member with the upper and lower biasing portions extending along the arcuate portion and the arm portion of the blade mount member.

* * * * *